United States Patent
Cavalcante de Almeida et al.

(10) Patent No.: US 11,775,072 B1
(45) Date of Patent: Oct. 3, 2023

(54) METHODS AND SYSTEMS FOR DISTRIBUTING AND/OR GENERATING A HAPTIC EFFECT ASSOCIATED WITH VIDEO CONTENT AND/OR AUDIO CONTENT

(71) Applicant: Immersion Corporation, Montreal (CA)

(72) Inventors: Carlos Felipe Cavalcante de Almeida, Montreal (CA); Juan Manuel Cruz Hernandez, Montreal (CA); Jamal Saboune, Montreal (CA); Chris Ullrich, Ventura, CA (US); Liwen Wu, Montreal (CA); Henry Da Costa, Montreal (CA)

(73) Assignee: IMMERSION CORPORATION, Ventura, FL (US)

( * ) Notice: Subject to any disclaimer, the term of this patent is extended or adjusted under 35 U.S.C. 154(b) by 0 days.

(21) Appl. No.: 17/719,995

(22) Filed: Apr. 13, 2022

(51) Int. Cl.
G06F 3/01 (2006.01)
G06F 3/16 (2006.01)
G06T 15/00 (2011.01)

(52) U.S. Cl.
CPC .............. *G06F 3/016* (2013.01); *G06F 3/011* (2013.01); *G06F 3/165* (2013.01); *G06T 15/00* (2013.01)

(58) Field of Classification Search
CPC . G06F 3/016; G06F 3/011; G06F 3/01; G06F 3/165; G06F 3/167; G06T 15/00
See application file for complete search history.

(56) References Cited

U.S. PATENT DOCUMENTS

| | | | |
|---|---|---|---|
| 11,562,531 B1* | 1/2023 | Krol | G06T 15/80 |
| 11,593,989 B1* | 2/2023 | Krol | H04L 12/1827 |
| 2018/0161671 A1 | 6/2018 | Heubel | |
| 2018/0200619 A1 | 7/2018 | Guillotel et al. | |
| 2022/0392175 A1* | 12/2022 | Freiwirth | H04L 65/1093 |
| 2022/0399761 A1* | 12/2022 | Leppanen | H02J 50/90 |
| 2022/0404907 A1* | 12/2022 | Rubin | H04L 65/1089 |
| 2023/0066318 A1* | 3/2023 | Chen | G06Q 10/101 |
| 2023/0100610 A1* | 3/2023 | Pastrana Vicente | G06F 3/017 715/727 |

OTHER PUBLICATIONS

Written Opinion and International Search Report dated Jun. 30, 2023 in Intl. Appl. No. PCT/US2023/017707.
El Far et al., "Haptic Applications Meta-Language," Distributed Simulation and Real-Time Applications, Tenth IEEE International Symposium On, IEEE, PI, Oct. 1, 2006 (pp. 261-264), XP031022104.

(Continued)

*Primary Examiner* — Vijay Shankar
(74) *Attorney, Agent, or Firm* — MEDLER FERRO WOODHOUSE & MILLS PLLC

(57) ABSTRACT

In aspects, methods and apparatus are provided for the generation of haptic command signals to cause haptic effect outputs at one or more haptic output devices. The haptic command signals may be generated based on haptic media, supplementary media, and/or haptic device capability. Generating the haptic command signals may include creation or modification of haptic effects, distribution of haptic effects, and/or warping of haptic signals. The methods and apparatus may operate according to combinations of developer provided rules and system enabled inferences. Numerous other aspects are provided.

19 Claims, 17 Drawing Sheets

(56) References Cited

OTHER PUBLICATIONS

Muthusamy et al., "[Haptics] Final Call for Proposals on the Coded Representation of Haptics,"134. MPF Meeting; 20210426-20210430, Motion Picture Exper Group OR ISO/IEC JTC1/SC29/WG11, No. m56455, Apr. 30, 2021, XP030295007.

Danieau, "Contribution to the Study of Haptic Feedback for Improving the Audio-Visual Experience Dr. Julien Fleureau," Feb. 13, 2014, XP055234641.

* cited by examiner

METHODS AND SYSTEMS FOR DISTRIBUTING AND/OR GENERATING A HAPTIC EFFECT ASSOCIATED WITH VIDEO CONTENT AND/OR AUDIO CONTENT

TECHNICAL FIELD

The present invention is directed to a method and system for distributing and/or generating a haptic effect associated with video content and/or audio content, such as spatialized video content and spatialized audio content. The methods and systems may have application in entertainment, gaming, and other situations.

BACKGROUND

The Motion Pictures Expert Group (MPEG) is developing a standard referred to as MPEG-I, wherein "I" refers to presenting visual aspects and/or audio aspects of a scene in an immersive manner. Such a standard may be used to provide, for instance, a 360-degree video or 360-degree image which may provide to a user an omnidirectional view of a scene. In some instances, the 360-degree video or 360-degree image may provide a view which changes with a field of view, wherein the field of view may be controlled with multiple degrees of freedom, such as three degrees of freedom (3 DoF) or six degrees of freedom (6 DoF).

It is desirable to provide systems and methods for providing haptic effects suitable for such audio/video environments.

SUMMARY

In an embodiment, a haptic management system for providing one or more haptic effects associated with an application that is providing at least one of spatialized video content or spatialized audio content to an end user device of a user is provided. The haptic management system may include at least one processor, a non-transitory computer-readable medium having instructions which, when executed by the at least one processor, causes the at least one processor to perform a series of steps. The processor may be caused to perform receiving, from the application, haptic description information which describes an intended haptic sensation to accompany the spatialized video content or spatialized audio content, wherein the spatialized video content and spatialized audio content are video content and audio content, respectively, that represent a three-dimensional (3D) space surrounding a virtual location of a user in the 3D space and provides information regarding a direction of one or more features in the 3D space relative to the virtual location of the user. The processor may be caused to perform identifying a haptic output device which is in a physical environment of the user and is able to generate one or more haptic effects for the user. The processor may be caused to perform determining a haptic capability of the haptic output device. The processor may be caused to perform generating a haptic command signal for the haptic output device based on the haptic capability of the haptic output device, and based on the intended haptic sensation described by the haptic description information, wherein the haptic command signal has a different format than the haptic description information or has different content than the haptic description information. The processor may be caused to perform communicating the haptic command signal to the haptic output device to cause the haptic output device to produce or approximate the intended haptic sensation.

In a further embodiment, a method for providing one or more haptic effects associated with an application that is providing at least one of spatialized video content or spatialized audio content to an end user device of a user is provided. The method includes receiving, from the application, haptic description information which describes an intended haptic sensation to accompany the spatialized video content or spatialized audio content, wherein the spatialized video content and spatialized audio content are video content and audio content, respectively, that represent a three-dimensional (3D) space surrounding a virtual location of a user in the 3D space and provides information regarding a direction of one or more features in the 3D space relative to the virtual location of the user; identifying a haptic output device which is in a physical environment of the user and is able to generate one or more haptic effects for the user; determining a haptic capability of the haptic output device; generating a haptic command signal for the haptic output device based on the haptic capability of the haptic output device, and based on the intended haptic sensation described by the haptic description information, wherein the haptic command signal has a different format than the haptic description information or has different content than the haptic description information; and communicating the haptic command signal to the haptic output device to cause the haptic output device to produce or approximate the intended haptic sensation.

BRIEF DESCRIPTION OF THE DRAWINGS

The foregoing and other features, objects and advantages of the invention will be apparent from the following detailed description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

Figure 1A:
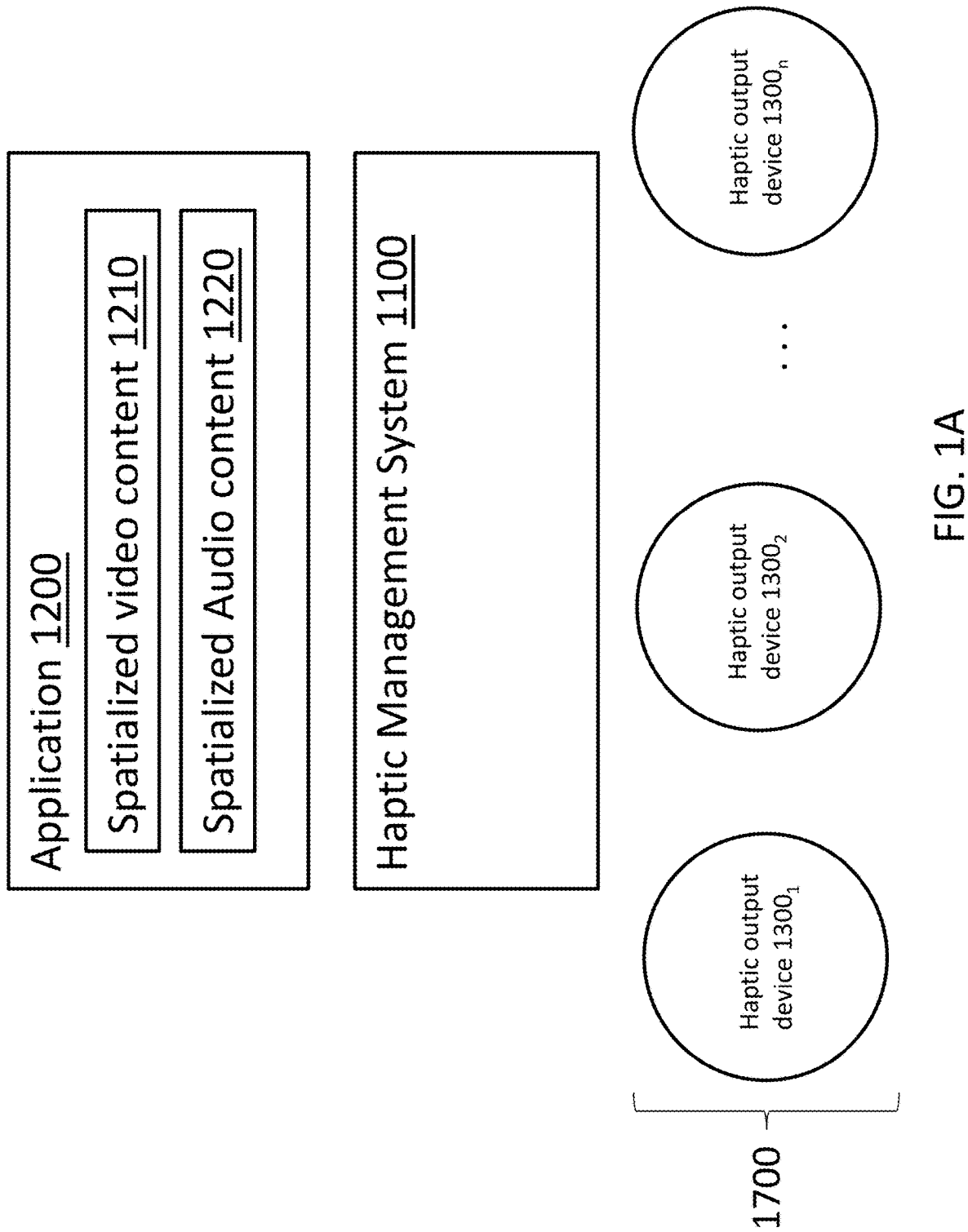
FIGS. 1A-1G depict various system arrangements for rendering a haptic effect associated with a 3D environment described by media data, according to an embodiment hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

An aspect of the present disclosure relates to a haptic management system (e.g., also referred to as a haptic manager), which may be configured to perform a method or methods for controlling distribution, creation, and/or warping of haptic output across one or more haptic output devices (e.g., one or more haptic actuators). The haptic effect may be generated for video content and/or audio content, such as spatialized video content (e.g., omnidirectional video, also referred to as 360° video) and spatialized audio content (e.g., multichannel surround sound), which are discussed below in more detail. The video content and audio content may be generated or otherwise provided by an application, such as a multimedia application or a gaming application.

The haptic management system may work with and/or receive as an input both haptic media and supplementary media. Haptic media may include haptic command signals, descriptive haptic information, and/or haptic algorithms. Haptic command signals are device or actuator specific signals that cause a specific physical haptic device to output a specific haptic effect. As used herein, "haptic effect" refers to the physical output of a haptic device. A collection of haptic effects output at one or more different haptic output devices may be referred to as a haptic experience or sensation. Haptic command signals may include electrical (digital or analog) signals to be provided directly to a specific physical haptic output device (e.g., LRA, ERM, piezo, etc.) to produce a desired output. In some embodiments, haptic command signals may include high level haptic commands specific to a particular haptic output device that may be translated into the specific electrical signals to be provided directly to the specific physical haptic output device. Haptic command signals cannot be used by unintended devices without transcoding or translating. Descriptive haptic information includes information, such as haptic effect primitives, that describe a desired or intended haptic experience, also referred to as a haptic sensation, in a device or modality agnostic fashion. Haptic effect primitives are basic haptic effects defined, for example, by amplitude, duration, and/or frequency. Haptic effect primitives may be combined as building blocks or portions of more complex haptic effects. Descriptive haptic information may be non-specific with respect to specific haptic output devices. Descriptive haptic information may be non-specific with respect to haptic modality or compatible types of haptic devices. For example, a designer may indicate no preference for types or modalities of haptic output devices for outputting a specific haptic experience. In some embodiments, descriptive haptic information may be specific with respect to at least one of specific haptic output devices, haptic modalities, and/or types of haptic output devices. For example, a designer may indicate that a specific haptic modality or type of haptic device is preferred or required for a specific haptic experience. For haptic effects to be carried out, descriptive haptic information must first be synthesized into haptic command signals. Haptic algorithms include algorithms, methods, and other processes that, when executed or carried out, generate either haptic command signals or descriptive haptic information.

Haptic media may be limited to causing a single haptic effect at a single haptic device. Haptic media may also be expansive enough includes sequences of multiple haptic effects (e.g., haptic tracks) to be executed by multiple haptic devices.

The haptic management system provides the functionality to generate haptic command signals based on the received haptic media, obtained supplemental media, and haptic device information. The haptic management system may generate the haptic command signals through distribution, creation, and warping functionality. Generating haptic command signals refers to the generation of signals, such as drive signals, that may be provided directly to haptic output devices and/or to peripheral devices that include haptic output devices. Haptic command signals are configured to cause the output of haptic effects. Haptic command signals may include drive signals provided directly to haptic output devices (e.g., LRAs, ERMs, piezoelectric haptic devices, etc.) to cause haptic effects. Haptic command signals may also include signals configured to cause a haptically enabled peripheral device to output a haptic effect. In the case of peripheral devices, the haptic command signals may be formatted or structured in a fashion suitable for the peripheral device and it may be anticipated that the peripheral device may perform transcoding or translation of the received haptic command signal to cause the haptic effects to be output.

The haptic management system may provide a distribution functionality. The distribution functionality permits the routing of haptic effects for output at specific haptic devices. In the distribution functionality, the haptic management system may identify and select specific haptic devices for the delivery of one or more haptic effects. The haptic devices may be selected, for example, based on a location with respect to a user, a capability of the devices, and other parameters discussed below. The haptic management system may provide for distribution of several haptic effects at a time to various specific haptic devices to provide an enhanced overall haptic experience to a user. Generation of haptic command signals includes a distribution functionality, e.g., a routing of those haptic command signals to appropriate destinations.

The haptic management system may further provide a haptic warping functionality. Haptic warping, as used herein, may be employed to translate or transcode one or more haptic command signals or tracks intended for one haptic device output arrangement to another haptic device output arrangement. For example, haptic warping may permit a haptic command signal or series of haptic command signals that are intended for use with a specific collection of haptic devices to be translated or transcoded for use with a different collection of haptic devices and still provide a haptic effect or haptic experience to a user that is similar in nature. Haptic warping may involve transcoding haptic signals to produce haptic signals on a collection of haptic devices that differs in various ways (e.g., greater or fewer in number, differing capabilities, etc.) than the collection for which the haptic signal was originally intended.

The haptic management system may further provide for haptic creation functionality. Haptic creation may involve the creation of new or modification of existing haptic effects. Haptic effects may be created or modified according to various types of information, including haptic media as well as supplementary information. Supplementary information may include environmental, ambient, and/or contextual information, such as a visual information, audio information, application information, physics information, protocol information, biometric information, IoT information, and others. Haptic creation functionality may further include algorithmically generated haptic command signals. Haptic creation functionality may include the combined use of any and all information discussed above, and may further include the combination of information discussed above with existing haptic command signals to generate new and different haptic command signals to provide different, adjusted, or altered haptic experiences.

Haptic command signal generation functionality may involve creating one or more haptic command signals, such as a haptic drive signal or any other signal used to control the haptic effect to be generated by a haptic output device.

The haptic management system is configured to manage each of these functionalities in combination to generate haptic command signals to provide an appropriate and improved (e.g., optimized) haptic experience to a user based on the user's specific haptic arrangement (e.g., as defined by the number, capabilities, locations, device state information, etc., of the haptic output devices employed by the user). The haptic management system may perform a process in which the system receives as input a set of one or more haptic media and optionally supplementary media, identifies the user's haptic arrangement, warps, creates and/or modifies the haptic media and distributes the resultant effects to generate device specific haptic command signals and communicate these haptic command signals appropriately to the user's haptic arrangement to generate a haptic experience.

FIG. 1A illustrates an example system that includes a haptic management system 1100, one or more haptic output devices $1300_1$ through $1300_n$. The one or more haptic output devices $1300_1$ through $1300_n$ may also be referred to as a haptic arrangement. As stated above, the haptic management system 1100 may provide or augment an ability to create haptic effects for an application 1200. The application 1200 may be operational on a mobile device, tablet, gaming system, device, or environment, laptop, server, and/or any other suitable computational device. More particularly, the application may generate or otherwise provide spatialized video content 1210 and spatialized audio content 1220, discussed in more detail below.

The application 1200 may provide a three-dimensional (3D) environment that depicts a virtual environment and/or physical environment, and may be viewable by a user through an end user device (discussed below in FIG. 1B). In an aspect of the present disclosure, the 3D environment may be, e.g., a virtual reality (VR) environment, an augmented reality (AR) environment, an extended reality (XR) environment, or some other 3D environment. In some aspects, the spatialized video content may provide the 3D environment by providing an omnidirectional view of a scene, in which the user can control a viewing angle at a viewpoint location, which may be a virtual location in the 3D environment. In some instances, if the 3D environment represents a physical space (e.g., a sporting venue, a concert, a park, etc.), the virtual location may correspond to a physical location in the physical space. The viewing angle may be used to control an orientation of a virtual field of view, so as to view different parts of the 3D environment. For example, the 3D environment may be part of a 360 degree video, also referred to as an immersive video or spherical video. The viewpoint may be controlled with multiple degrees of freedom, such as three degrees of freedom (e.g., 3 DoF) or six degrees of freedom (e.g., 6 DoF). The omnidirectional viewpoint may allow the user to experience the 3D environment in an immersive way. In some instances, the video content and/or audio content may be generated according to the MPEG-I standard. For example, the media data may be a MPEG-I stream or other media stream which is provided to the computing device 1100 via a network.

The haptic management system 1100 may operate in conjunction with the application 1200 in various different ways to provide a haptic experience via the haptic output devices 1300, as shown in FIGS. 1B-1H.

Figure 1B:
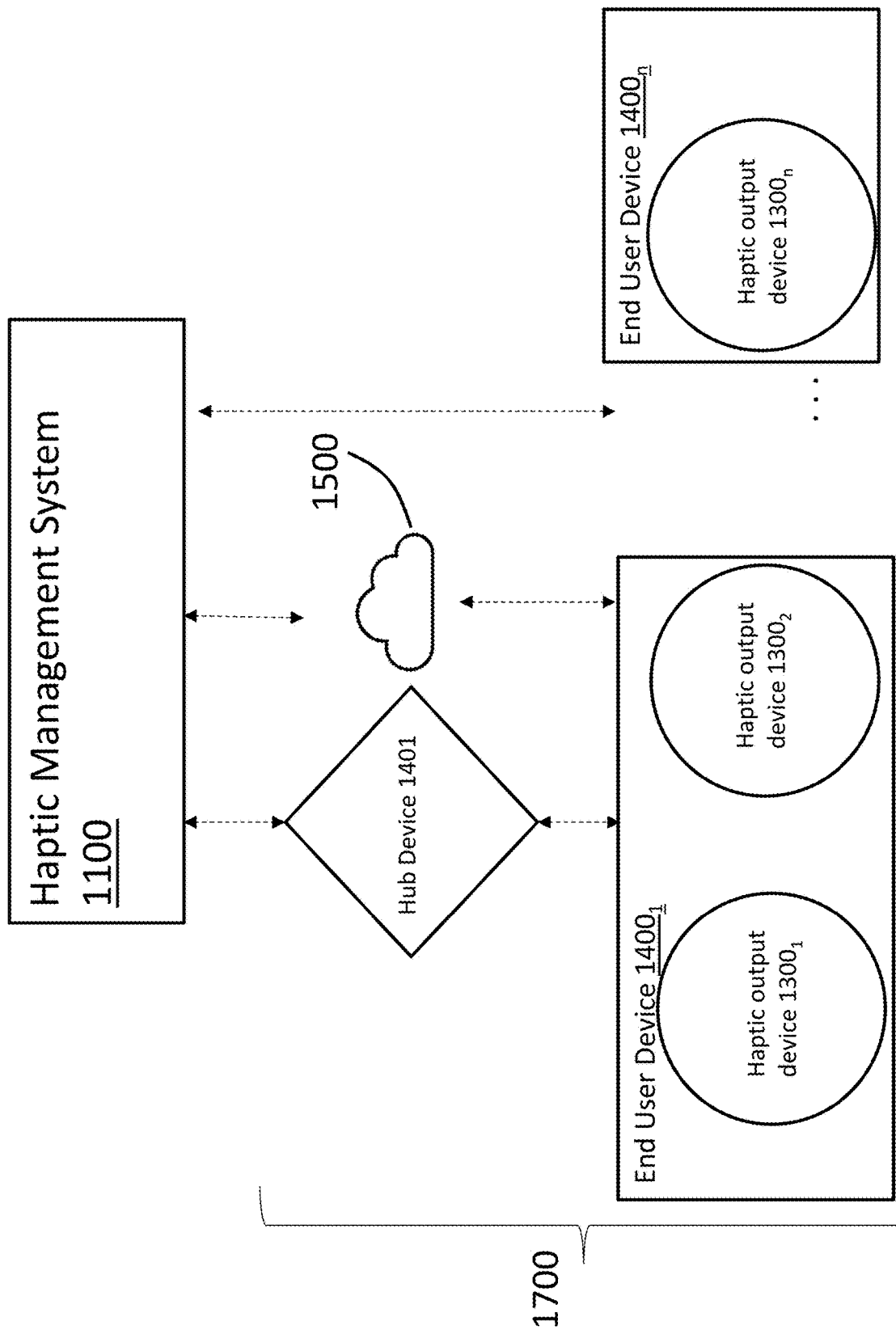

For example, as shown in FIG. 1B, the haptic management system 1100 may communicate with various end user peripheral devices 1400, either directly, through a network 1500, and/or through a hub device 1401. The various end user peripheral devices 1400 may each include one or more haptic output devices 1300. In embodiments, hub device 1401 may also include haptic output devices 1300, and may provide both haptic output functionality as well as hub distribution functionality.

Figure 1C:
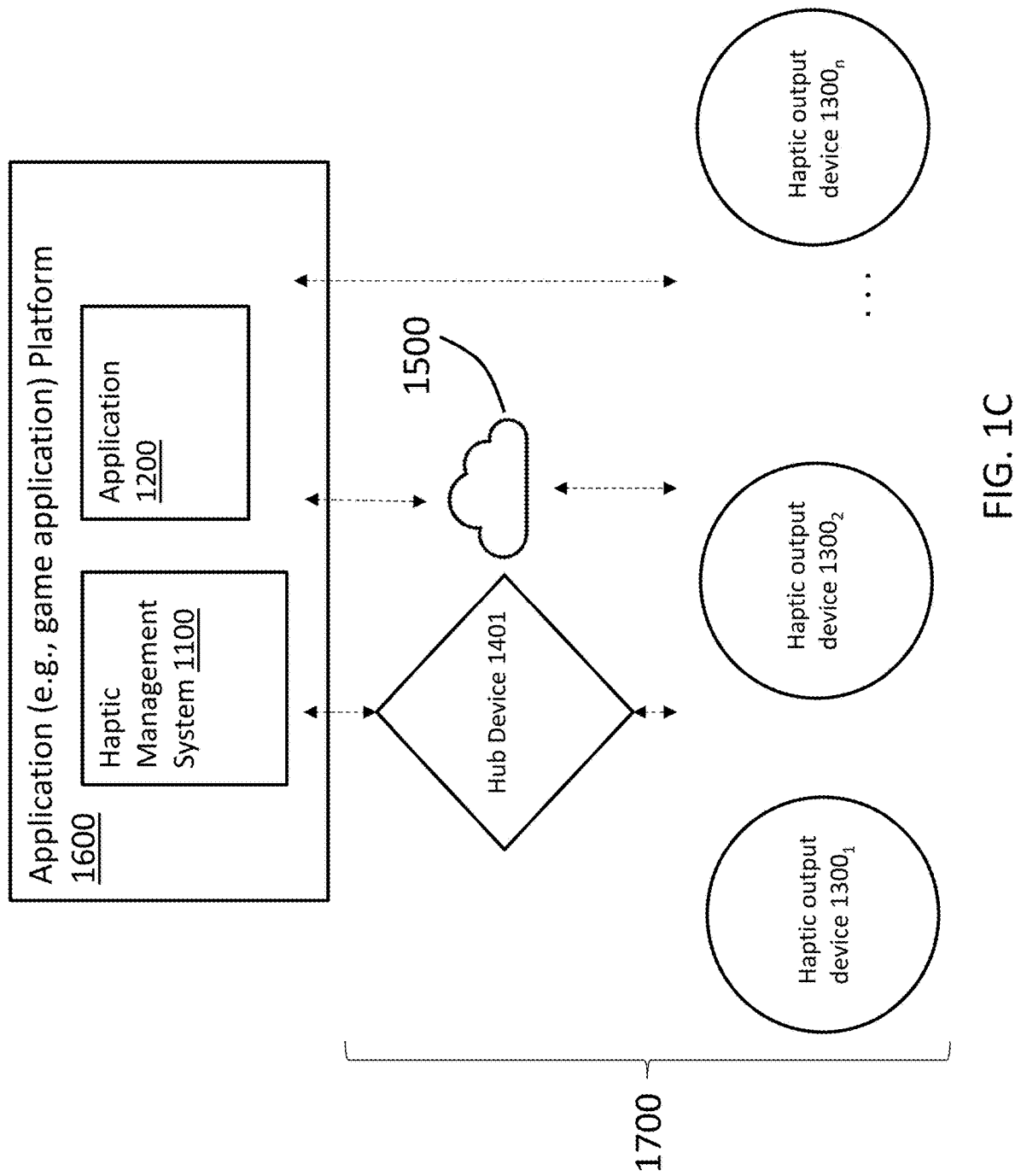
Figure 1D:
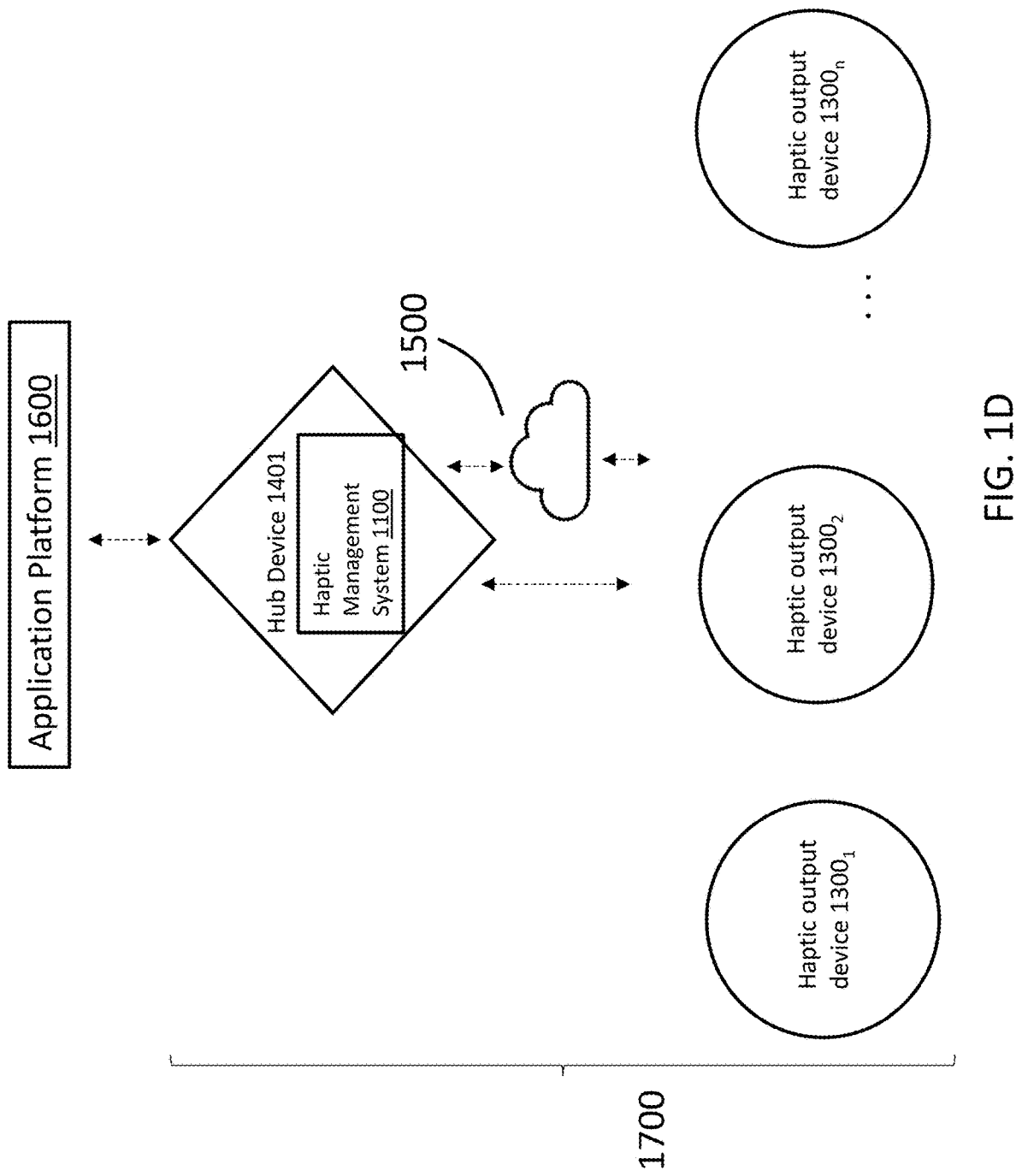
Figure 1E:
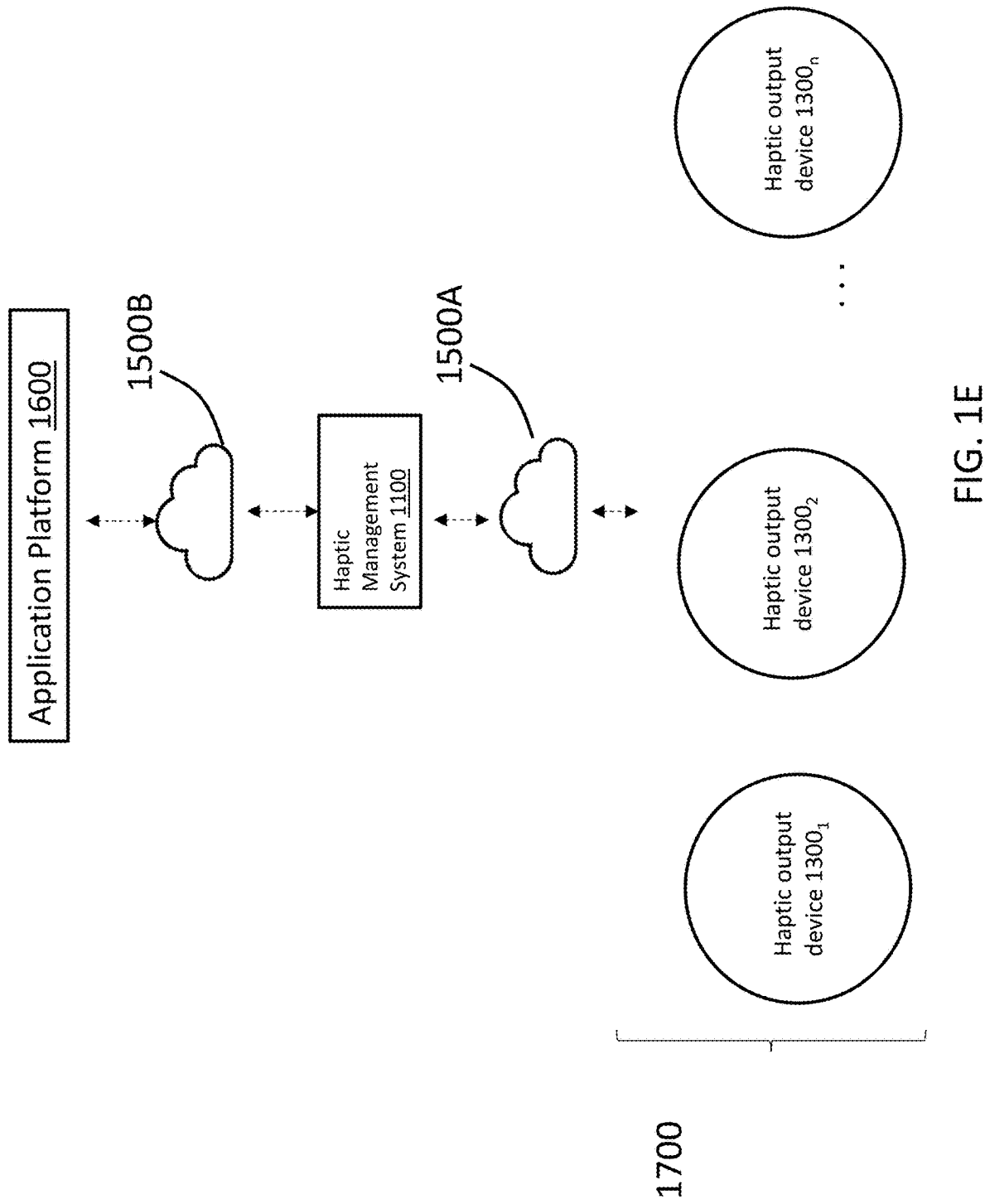

In another example, the haptic management system 1100 may operate and interface directly with the application 1200 on an application platform 1600 on which the application runs, as shown in FIGS. 1C and 1E. The haptic management system 1100 may operate locally to the application platform 1600 (shown in FIG. 1C) or in a cloud-based fashion (shown in FIG. 1E) to distribute, warp, and/or create or modify a haptic experience as dictated by the application. When the haptic management system 1100 operates in the cloud, all processing of data for distribution, warping and creation/modification of haptic outputs is also performed in the cloud. The haptic management system 1100 may also directly couple to the application platform 1600 via cloud or local storage, or it may couple to one or more hub devices (haptic or non-haptic) that are coupled to the application platform and may enable the distribution to subsequent haptic devices. In this context, the application 1200 may run on any number or type of application platforms 1600 without any required modifications due to a user's haptic arrangement 1700. The haptic management system 1100 may be accessed directly by the application 1200 to provide all necessary functionality to provide the application-indicated haptic experience to the user's haptic arrangement.

As shown in FIG. 1C, the haptic management system 1100 executing in the local computing device (e.g., host) may be coupled through wired or wireless networking to haptic or non-haptic hub devices 1400 (e.g., "commanders") and to haptic devices 1300 (e.g., "executers"). Coupling to "executers" can, therefore, be done directly with the local host or indirectly via hub devices.

In another example, the haptic management system 1100 may operate in or on one or more peripheral devices 1400 associated with the haptic arrangement 1700, as shown in FIG. 1D. For example, the haptic management system 1100 may operate on a peripheral hub device 1401 operating as a hub that manages multiple haptic output devices 1300. In embodiments, the haptic management system 1100 may operate on peripheral device 1400 to manage multiple haptic output devices of a haptic arrangement associated with the peripheral hub device 1401 (e.g., a multi-actuator haptic vest or multi-actuator haptified controller). The application platform 1600 outputs haptic media (e.g., haptic command signals, haptic descriptive information, and or haptic algorithms) associated with an intended haptic experience or sensation. The haptic management system 1100, operating on a peripheral device 1400, such as a hub device, receives the haptic media and warps, creates, modifies, and distributes haptic command signals to the specific haptic output devices of the haptic arrangement to achieve the intended haptic experience. Thus, the output of the application 1200 is not dependent on the nature and form of a user's haptic arrangement.

Figure 1F:
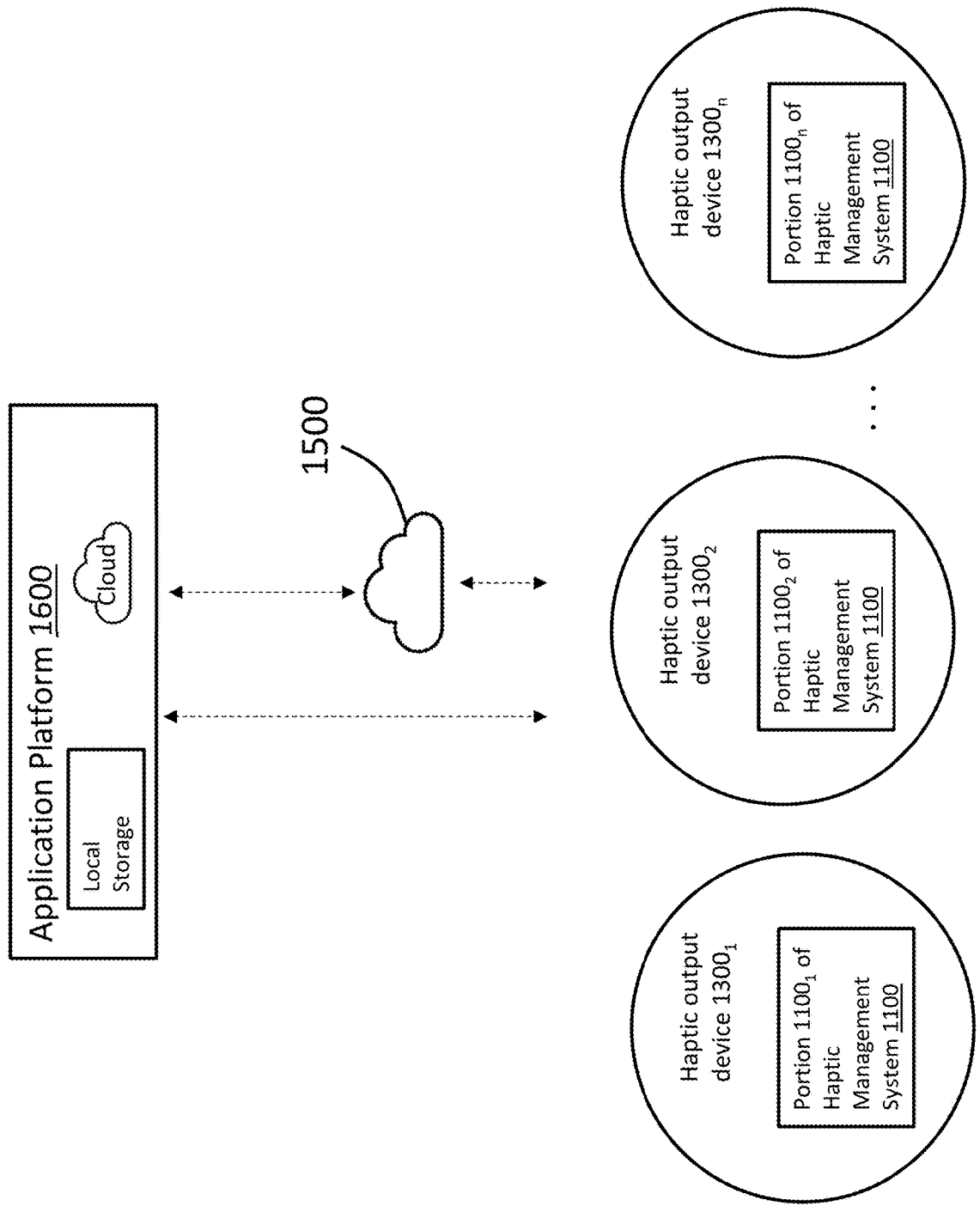

In another example, the haptic management system 1100 may operate in conjunction with one or more single haptic output devices 1300 to provide the necessary improvements (e.g., optimization) to achieve the haptic experience, as shown in FIG. 1F.

In still further examples, multiple haptic management systems 1100 may operate at multiple levels (e.g., both the application level and the device level), combining various aspects of the above embodiments shown with respect to FIGS. 1A-1F. The multiple haptic management systems 1100 may communicate with one another to convey information appropriate for outputting the intended haptic experience. For example, a haptic management system 1100 in operation at the application level may communicate haptic media to one or more haptic management systems 1100 in operation at the device level (for example, separate haptic management systems 1100 associated with a user's headset, vest, and controller(s)). The application level haptic management system 1100 may coordinate the overall haptic experience while permitting the device level haptic management systems to coordinate device specific commands.

In embodiments, the haptic output devices 1300 may be associated with user peripheral devices such as headsets, helmets, controllers, rings, gloves, watches, controllers, haptic clothing, and others. The haptic output devices 1300 may be configured to generate a haptic effect at the user peripheral device. The haptic effect may include, e.g., a vibrotactile haptic effect, a kinesthetic haptic effect, an electrostatic friction (ESF) effect, a deformation effect (e.g., a squeeze effect or poke effect), a temperature-based effect, a pneumatic-based effect, and/or some other haptic effect. In embodiments, the haptic output device 1300 in the user peripheral device or in any other device may include, e.g., a piezoelectric actuator, an electric motor, an electro-magnetic actuator, a voice coil, a shape memory alloy, an electro-active polymer, a solenoid, an eccentric rotating mass motor (ERM), a linear resonant actuator (LRA), a spinning or scalable rotary actuator (SRA), an ultrasonic actuator, a deformation device, an electrostatic actuator, a shape memory material (SMA) actuator, electroactive polymer (EAP) actuator, a macro-fiber composite (MFC) actuator, a solenoid resonance actuator, a Peltier device, a pneumatic pump, or any other haptic output device.

In embodiments, a user peripheral device may be an end user device that provides a view of the 3D environment, and/or receives user input for controlling user interaction with the 3D environment. For instance, the user peripheral device may be or include a head-mounted device (HMD) that displays or otherwise presents various portions of a scene represented by the 3D environment. The HMD may change which portion of the 3D environment is displayed based on a user movement or other user input detected by the HMD. In an aspect of the present disclosure, the user peripheral device may be a handheld device, such as a phone or a game console controller, which may be configured to receive user input for interacting with the 3D environment. The user input may be, e.g., a touch gesture or a movement gesture. If the user peripheral device is a phone, the phone may also be configured to display or otherwise present different portions of the 3D environment. In an aspect of the present disclosure, the user peripheral device may be a wearable device.

In embodiments, the haptic output devices 1300 may be integrated into the user peripheral devices 1400, and may generate a tactile sensation or other haptic effect which may be felt by a person's face via a strap, eye cover, or other portion of the user peripheral device 1400. In this modality, the haptic effect at the user peripheral device 1400 may indicate presence of a simulated environmental condition, such as rain or snow in a 3D environment representing a remote location, or an explosion in a 3D environment representing a game. Such a haptic effect may allow a user to feel more immersed in the 3D environment.

Figure 1G:
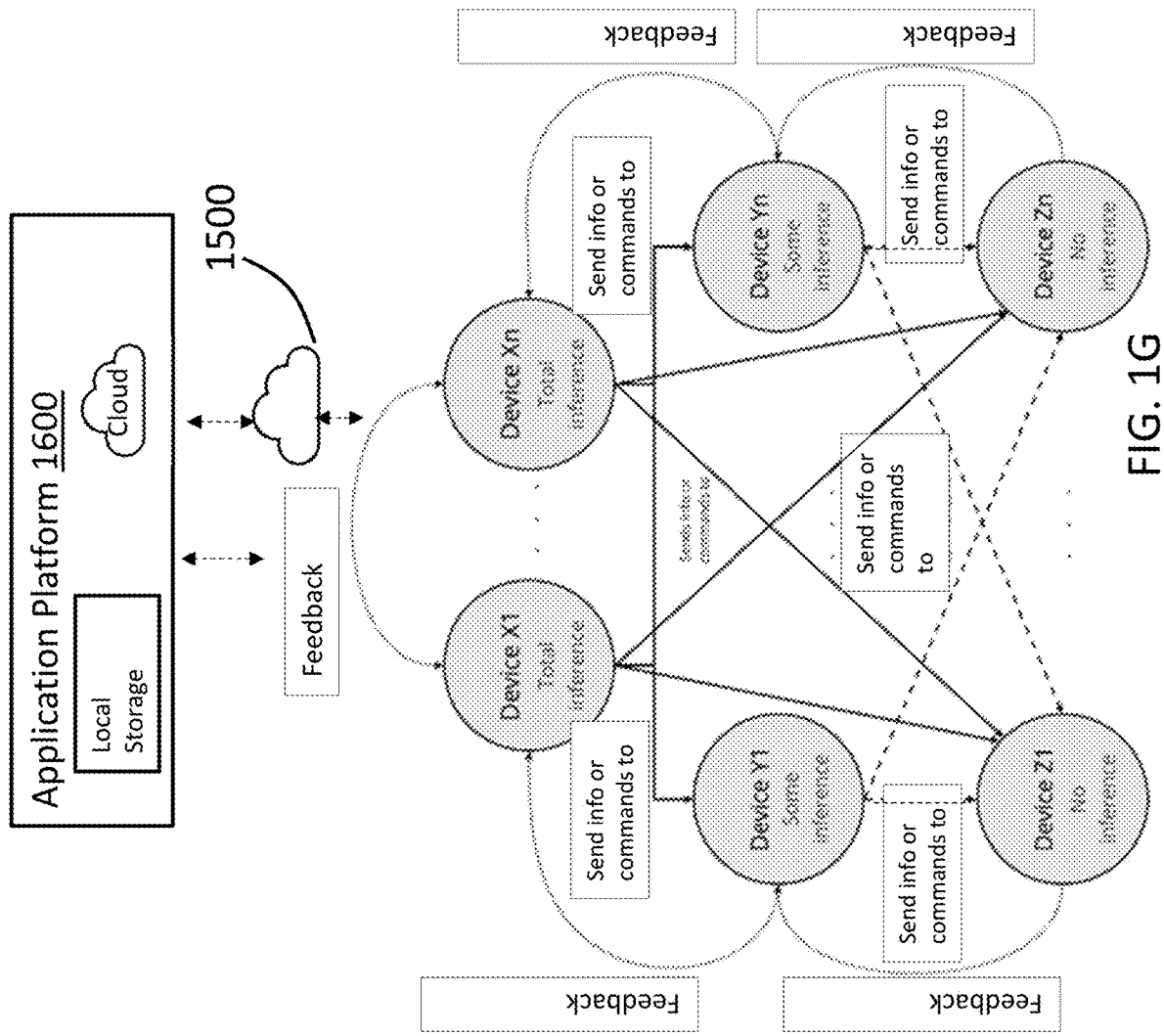

In further embodiments, as shown with respect to FIG. 1G, multiple user peripheral devices 1400 may be arranged in a hierarchical haptic arrangement. The haptic output devices 1300 may each operate an instance of the haptic management system 1100. The user peripheral devices 1400 may be arranged in a hierarchy, wherein each device provides haptic media to and receives feedback from the devices below or at a same level in the hierarchy. The user peripheral devices 1400 at the top of the hierarchy may receive haptic media about a haptic experience directly from an application platform 1600 and provide processed haptic media to the user peripheral devices 1400 below them in the hierarchy, which in turn pass further processed haptic media to user peripheral devices 1400 further below in the hierarchy. For example, a top level management peripheral device hub 1400 may be configured to coordinate the haptic experience for all of a user's peripheral devices, including, e.g., a headset, a vest, and two handheld controllers. The top level management peripheral device hub 1400 receives haptic media dictating the haptic experience from the application platform and processes the haptic media (e.g., warps, creates/modifies, distributes) before passing it to each of the next level peripheral devices 1400. Each of these devices receive the partially processed haptic media and then perform further processing to refine the received haptic media for output on each of the specific haptic output devices 1300 associated with each user peripheral device 1400. Thus, the subsequent processing of the haptic media through the various hierarchical layers becomes more and more concrete with respect to the specific haptic output devices.

Various other arrangements of the haptic management system 1100 are consistent with embodiments hereof, and FIGS. 1A-1G are by way of example only. The haptic management system 1100 may be distributed across a local computing device, the cloud, hub devices, and haptically enabled user peripheral devices. When the haptic management system 1100 executes in one or more devices that are peripheral to the local computing device, these peripheral devices can serve as hub devices (e.g., haptic or non-haptic) or they can be all haptic devices. Hub devices can be coupled to other haptic devices either via network (e.g., wired, wireless, or IP protocol) or via cloud but the haptic management system 1100 can also operate in all haptic devices. Hub devices can expose proxy interfaces for collections of haptic devices and additional (e.g., downstream) hubs to enable hubs to present as aggregate haptic devices to the haptic manager. Additionally, when the haptic management system 1100 executes in more than one device simultaneously, it can also be executing at different levels of inference. This can, for example, open to the possibility a communication method based on a hierarchy of devices given their respective levels of inference, as discussed further below.

Figure 2:
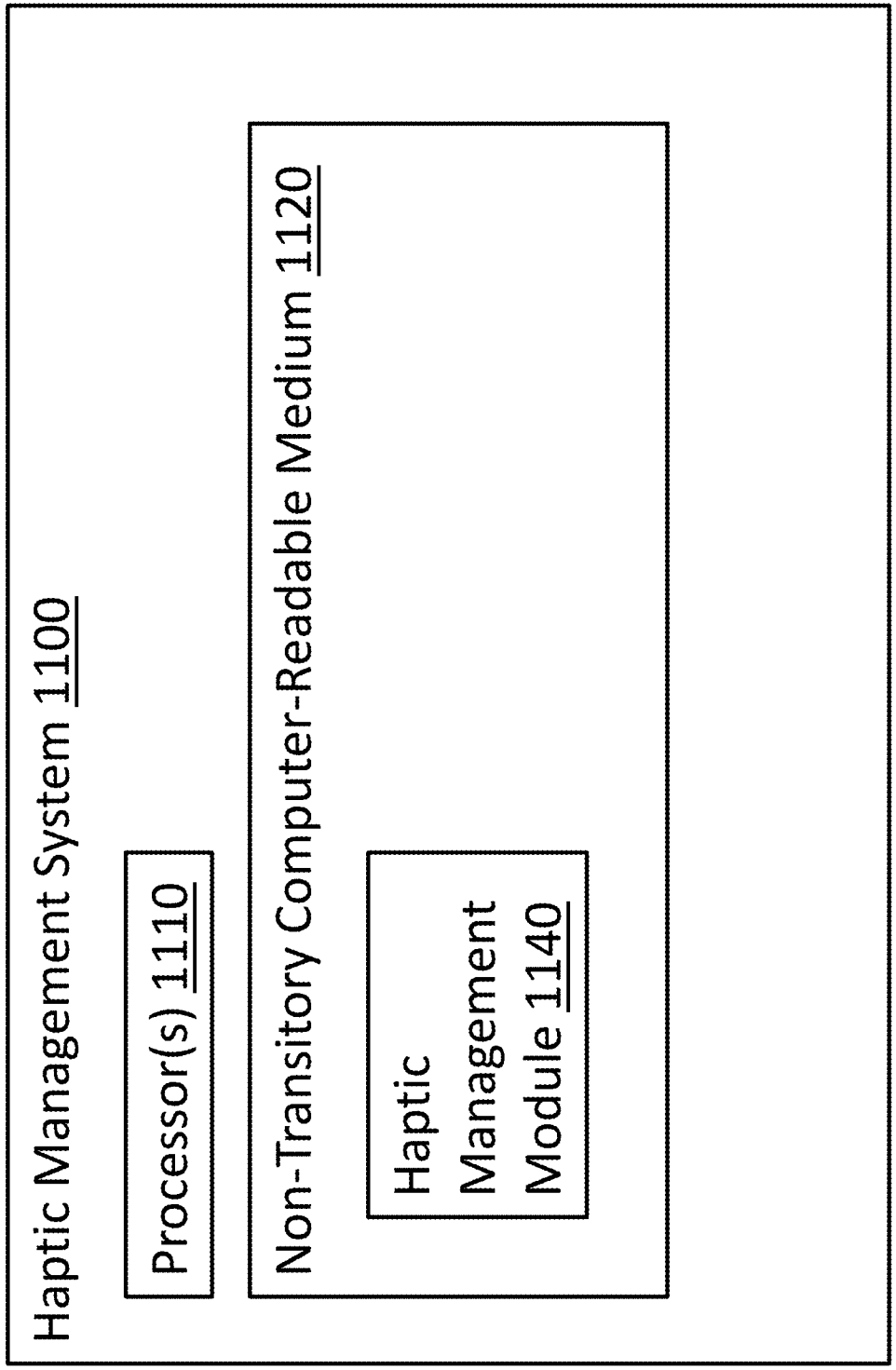
FIG. 2 depicts a block diagram of an example computing device which may perform a method that facilitates the generating a haptic effect, according to embodiments hereof.

FIG. 2 illustrates an example embodiment of a haptic management system 1100 consistent with embodiments hereof. As illustrated, the haptic management system 1100 may include at least one processor 1110 and a non-transitory computer-readable medium 1120. The non-transitory computer-readable medium 1120 may computer instructions for executing a haptic management module, as described in greater detail below.

In some aspects, the at least one processor 1110 may include a microprocessor, a digital signal processor (DSP), an application-specific integrated circuit (ASIC), field programmable gate arrays (FPGAs), a programmable logic controller (PLC), and/or state machines. In some implementations, the at least one processor 1110 may include a programmable electronic device such as a programmable logic controller. The processor 1110 may be in communication with the memory 1120.

In some aspects, the memory 1120 may include a non-transitory computer-readable medium, such as random access memory ("RAM"), read-only memory ("ROM"), erasable and programmable read-only memory ("EEPROM"), or the like. The memory 1120 may store program components that configure operation of the haptic management system 1100. In some aspects, the system may include network interface device may be configured to facilitate a network connection. As an example, the network interface device may include a wired interface, such as an Ethernet, USB, IEEE 1394 communication component, and/or a wireless interface, such as an IEEE 802.11, Bluetooth, or radio frequency (RF) communication component (e.g., a RF component for accessing cellular telephone networks).

Figure 3:
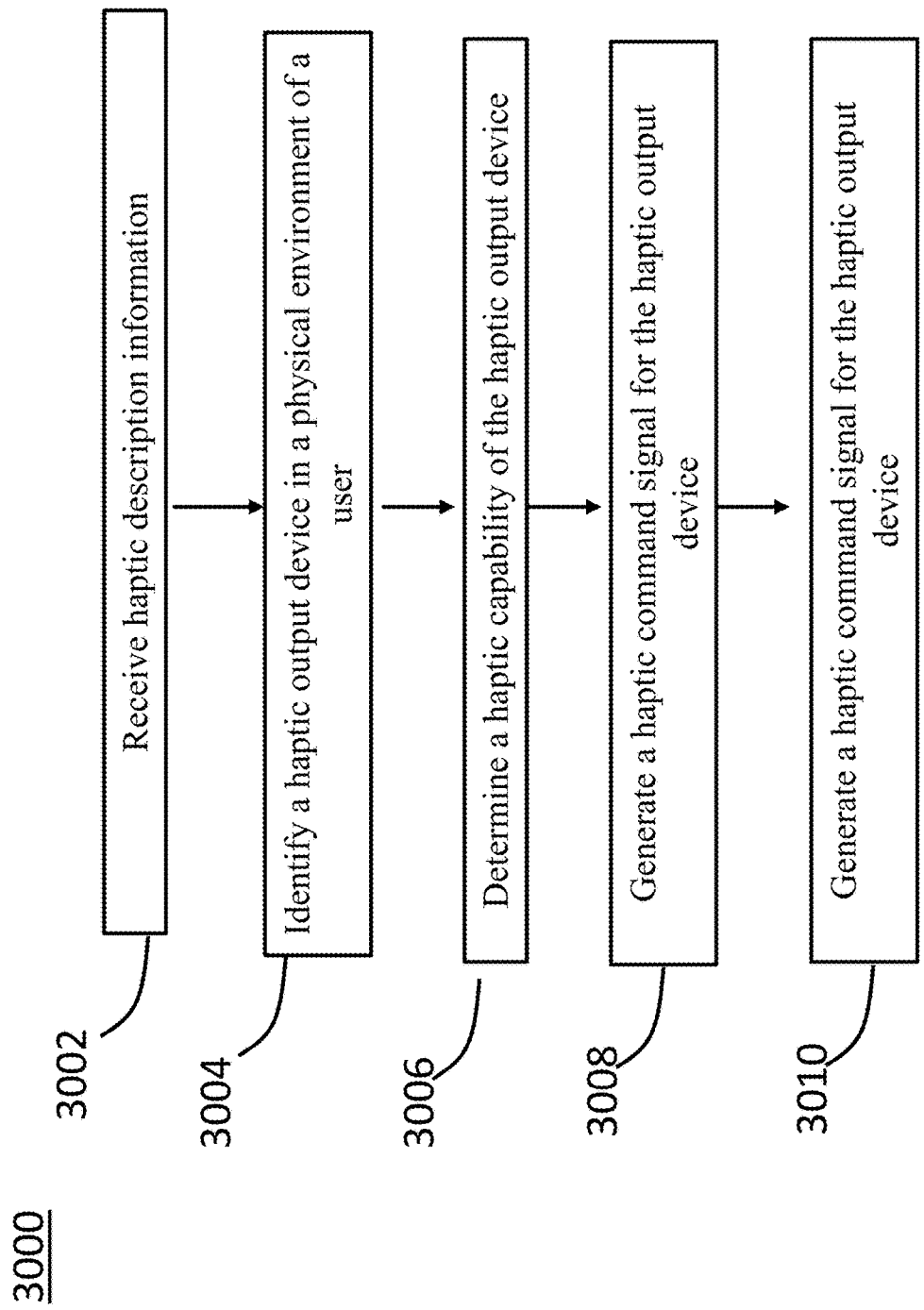
FIG. 3 is a flowchart illustrating a method of generating haptic command signals consistent with embodiments hereof.

FIG. 3 illustrates a method 3000 for generating haptic command signals for the distribution of one or more haptic effects. The method 3000 may be carried out by haptic management system 1100, e.g., by the at least one processor 1110 executing software instructions of the haptic management module 1140 stored on the memory 1120. The steps of the method 3000, as described below, may be carried out sequentially, simultaneously, and/or in a different order than that described, as appropriate. In embodiments, some of the steps described may be omitted and/or duplicated. The method 3000 may be executed by a haptic management system (e.g., haptic management system 1100) configured to provide one or more haptic effects associated with an application that is providing or is configured to provide at least one of spatialized video content or spatialized audio content to an end user device of a user.

In an operation 3002, the method 3000 includes a step of receiving, from an application, haptic description information or other haptic media. The haptic description information may describe an intended haptic sensation to accompany the spatialized video content or spatialized audio content. The spatialized video content and spatialized audio content are video content and audio content, respectively, that represent a three-dimensional (3D) space surrounding a virtual location of a user in the 3D space. The spatialized video content and spatialized audio content provide information to a user regarding a direction of one or more features in the 3D space relative to the virtual location of the user. As discussed above, the haptic description information describes an intended haptic sensation or experience and may or may not include the specific haptic command signals required to output the intended haptic sensation via a specific set of haptic output devices.

Various aspects of the present disclosure relate to providing a haptic effect for a 3D environment. The 3D environment may present a scene in an omnidirectional manner, for example, an omnidirectional video that represents an appearance of the 3D space in multiple directions relative to the virtual location of the user. The scene may represent, e.g., a physical venue or other physical space, such as a sporting venue or concert venue, or a virtual space, such as a virtual reality (VR) space for a game. The 3D environment may be experienced virtually by a user via a user peripheral device or other end user device, and may be experienced in an immersive manner. In some implementations, the 3D environment may be provided by media data that allows a user to view different portions of the scene and/or to navigate to different portions of the scene. Such content in the media data may be referred to as 3 DoF content or 6 DoF content, because they may allow a user to control a virtual field of view in the 3D environment in three degrees of freedom or six degrees of freedom, as discussed below in more detail.

As an example, the media data may include a 360-degree video (e.g., also referred to as a spherical video) which may provide an immersive experience in which a user can view different portions of a scene captured by the video. In some instances, the 360-degree video or other media data may be provided via the MPEG-I standard, which is a standard being developed by the Moving Picture Expert Group (MPEG). For example, the 360-degree video may be generated by various sensors (e.g., one or more cameras and/or one or more microphones) which generate sensor data that capture the scene, such as a sports match or concert, in multiple directions. The sensor data may be encoded into a MPEG-I stream according to the MPEG-I standard, and may be broadcast or otherwise communicated over a network to a user peripheral device or other end user device. The content in the MPEG-I stream may include story-driven content, experience-driven content, event-driven content, and/or interaction-driven content, as discussed below in more detail.

Similarly to spatialized video content, the spatialized audio content may provide an immersive omnidirectional experience. The spatialized audio content may be configured and arranged such that it is perceived by a user to be originating from any (e.g., or multiple) three dimensional location within the 3D environment. Spatialized audio data may include multiple channels of audio content that provide surround sound to the user.

In addition to or in lieu of receiving haptic description information, the haptic management system 1100 may receive or obtain any other type of haptic media, including, for example, haptic command signals and/or haptic algorithms.

In an operation 3004, the method 3000 includes identifying a haptic output device (or devices) which is in a physical environment of the user and is able to generate haptic effects for the user.

The haptic management system 1100 may identify the haptic output devices according to devices that have registered with the haptic management system 1100. Registration with the haptic management system 1100 may involve an initial system coordination that includes a transmission of haptic device information from each haptic output device or user peripheral in the system to haptic management system 1100. Device information may include, for example, type of device, capabilities (e.g., output frequency and amplitude), device location, device battery life, and more. The haptic management system 1100 may receive and store device information from each registered haptic output device. The haptic management system 1100 may, regularly or irregularly, query the registered haptic output devices to update device information. Identifying the haptic output devices in the physical environment of the user may include consulting the stored device information to determine which devices are available for haptic effect generation.

Identifying the haptic output devices in the physical environment of the user may further include querying devices within the local environment to determine whether they are available for haptic effect generation. Querying devices may include querying registered devices to determine a current status as well as querying all devices within answering range (e.g., including unregistered devices) to request device information and device status and availability.

In an operation 3006, the method 3000 includes determining a haptic capability of the identified haptic device or devices. Haptic capabilities of the haptic device or devices may be included within and/or determined from device information transmitted by the one or more peripheral devices that include the haptic device or devices. Haptic capabilities may include frequency output ranges, amplitude output ranges, device types, device locations, remaining power, and others.

In an operation 3008, the method 3000 includes generating a haptic command signal for the haptic output device based on the haptic capability of the identified or selected haptic output device (or devices) and based on the received haptic media. Generating the haptic command signal may include creation/modification, warping, and/or distribution of the signals/information associated with the haptic media. As discussed above, haptic media may include haptic description information describing intended haptic sensations, specific haptic command signals, and/or algorithms for the generation of haptic command signals. The haptic command signal generated during the method 3000 may have a different format (e.g., due to warping and/or distribution methods) and may have different content (e.g., due to creation methods).

Generation of the haptic command signal may proceed pursuant to a determination that the haptic description information (e.g., or other haptic media aspect) defines or is associated with a haptic device type, category, capability, and/or modality that does not match with the type, category, capability, and/or modality of haptic devices identified by the haptic management system 1100. Such a determination may be referred to as a mismatch determination and may represent a mismatch of any type between the haptic description information and the capabilities of the haptic system. Whenever it may be determined that the haptic media will not be passed directly to a haptic output device, the haptic management system 1100 may generate a haptic command signal. Accordingly, the haptic command signal generation may be performed so as to alter or improve (e.g., optimize) a haptic command signal generated from the haptic description information (e.g., or other haptic media aspect) for use with haptic output devices identified as available for use with the haptic management system 1100.

Generally haptic command signals may be generated according to various different factors and/or inputs, including, for example, haptic media, supplementary media, and haptic device capability. Each of these various different factors may be employed in different fashion by the haptic management system 1100 in creating, warping, and distributing haptic command signals.

As discussed above, haptic media may include one or more of haptic description information, specific haptic command signals, and haptic algorithms. The haptic media may contain one or more individual effects and/or include one or more tracks of haptic data that are complementary or that encode the same information at multiple resolutions or with different compression levels. In general, haptic media may specify target body location(s) for haptic stimulation. In some embodiments, for some devices, body location may be inferred.

As discussed above, haptic description information may include haptic data that describes intended or desired haptic effects or experiences in a format that is not suitable for direct transmission to a haptic output device. In embodiments, the haptic description information may include haptic effect primitives. Haptic effect primitives are basic haptic effects defined, for example, by amplitude, duration, and frequency. Combinations of haptic primitives may be used to form complex haptic effects or experiences. In embodiments, the haptic description information (or other example of haptic media) may include a baseline haptic effect or effects. Baseline haptic effects may include, for example, one or more basic haptic effects authored by a developer. Basic haptic effects may be provided as [inventors: what format/form are these provided in] In embodiments, as discussed below, collections of haptic primitives and/or baseline haptic effects may be subject to warping, distribution, and/or modification in the generation of haptic command signals for output.

Supplementary media may refer to any type of information that is supplemental to haptic media and device information. Supplementary media may refer to media or information associated with an application being executed, including audio (e.g., spatialized audio), video (e.g, spatialized video), and haptic data associated therewith, context information associated with an environment of the user, and other types of additional information. In embodiments, supplemental media may include an application programming interface (API) of the application, for example, to learn about, but not limited to, triggering events (e.g., hit, change in scores, accuracy, interaction with and collection of objects, textures, materials) and controller I/O. In embodiments, supplemental media may include information related to an application physics engine, for example, to understand the mechanics and dynamics applied to animations and interactions In embodiments, supplemental media may include sensor signals from a biometric sensor attached to the user or another sensor in the environment of the user. For example, information about the users' neurophysiological and/or physical states that can provide information about their attentional and emotional experiences and be used by the haptic management system 1100 to optimize or adjust the haptic signals accordingly. Supplemental media may further include protocol information, e.g., embedded information about the signals as well as the devices coupled to the haptic manager.

In further embodiments, the haptic management system 1100 may receive, obtain, and employ supplementary media from the spatialized video data, including, luminosity, reflections, UI components, and/or more. The haptic management system 1100 may receive, obtain, and employ supplementary media from the spatialized audio data, for example to enhance spatial understanding in terms of both directionality and proximation of audio information.

Supplementary media may include spatialized video and/or audio information. In embodiments, spatialized audio and video information may include information related to at least one of camera panning information, camera zoom information, surround sound information, and/or or texture information. Information within a spatialized audio/video file can lead to a better understanding for distribution, warping and generation of haptic outputs. For example, spatial information including spatial audio within the spatialized audio/video file may link the user (e.g., listener) to the camera movements and, thus, enable the haptic management system 1100 to improve (e.g., optimize) distribution, warping and creation of haptic outputs using information related to proximation, panning, zooming, and surround sound. This type of information may lead to creative haptic experiences such as dynamic changes in the range and type of sensations (e.g., zoom out leading to higher focus on environmental haptic feedback and zoom in leading to higher focus on details and egocentric feedback). Further, in the case of a user being simultaneously coupled to more than one camera, the haptic management system 1100 may also learn how to distribute, warp and create effects related to these multiple cameras by, for example, linking different cameras to different devices placed on the body or different haptic modalities within one or various devices. In another example, light information may be an important source of information for haptics. Light information may provide information regarding environmental lighting conditions. Light reflection may be used to create heatmaps for thermal inferences. These inferences can be done locally (e.g., object reflection) as well as globally (e.g., aggregate or average light reflection and variations to infer about environmental temperature).

Supplementary media may further include information or media associated with a user's external environment. For example, such information may include information obtained by sensors related to a lighting environment or audio environment of a user. In other examples supplemental media may include information related to an internet of things (IoT) network in a user's vicinity. For example, the haptic management system 1100 may request access to a local IoT network (e.g., which may or may not be owned, operated, or associated by the system user), such as smart lights and climate control, to use for generating the haptic command signals and for generating multimodal experiences with environmental devices. Access to IoT devices also includes access to personal devices with Lidars/Radars (e.g., smartphones or tablets) or any other type of environmental scanning technology r to track the user's physical environment (e.g., for AR or MR experiences) and body (e.g., positioning and motion) for tasks such as automatic identification of which devices are being used and their placement in the body, as well as the objects in and conditions of the environment.

Figure 4:
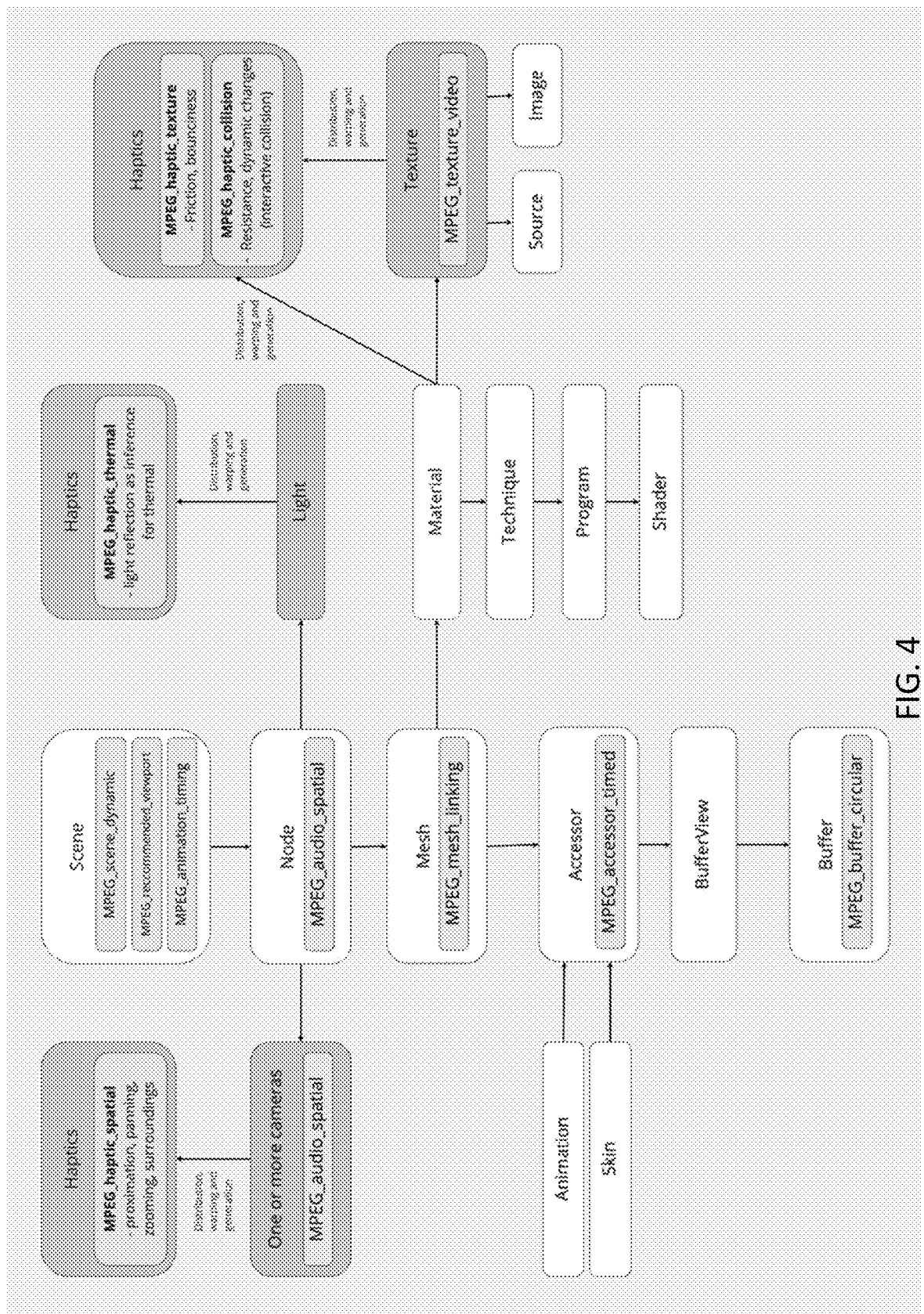
FIG. 4 illustrates an expanded MPEG-I architecture consistent with embodiments hereof.

In embodiments, spatialized audio/video files compatible with embodiments disclosed herein may be stored in an MPEG-I format, as illustrated in FIG. 4. FIG. 4 illustrates a general MPEG-I architecture including haptic information. As illustrated, the MPEG-I format may accommodate spatial haptic information, thermal haptic information, textural haptic information, and others.

In embodiments, the haptic command signal may be based on device information including number and capability of haptic output devices associated with the haptic system. Capabilities of haptic output devices may include frequency ranges, amplitude ranges, haptic device types, haptic device locations, haptic device remaining power, and any additional information describing a haptic device's ability to generate haptic effects.

Generally, haptic command signals may be generated according to methods of creating or modifying, methods of distribution, methods of warping, and combinations of each of these. Generating haptic command signals via creation or modification refers to using supplementary media or other sources to create new haptic effects and/or to modify the content of haptic effects contained in the haptic media. Generating haptic command signals via warping refers to the generation of haptic command signals to permit specified, authored, or defined haptic effects to be played or output at a designated device. Warping may include transcoding existing haptic command signals authored for use with a specific haptic output device into new haptic command signals suitable for different haptic devices. Warping may also include transcoding authored or defined haptic effects (e.g., primitives, baseline haptic effects) that don't have a specific output device target into haptic command signals for use with a designated device. Generating haptic command signals via distribution refers to the generation of haptic command signals to distribute haptic effects to be output or played at selected haptic devices, based on the capabilities of those devices.

In embodiments, generating a haptic command signal may include creating or modifying a haptic command signal at least partially based on supplementary media. In embodiments, haptic command signals created or generated via other means may also be modified based on supplementary media. Creating or modifying a haptic command signal based at least partially on supplementary media may further require information about the haptic device capability.

For example, in embodiments, the haptic command signal may be created or modified according to spatialized audio and/or video data. As discussed above regarding spatialized audio and video data, associated information may include camera panning information, camera zoom information, surround sound information, location information, and/or texture information.

Regarding spatialized audio and video data, associated information may include information defining spatial relationships between a user and various features in the 3D space. Based on the spatial relationship between the virtual location of the user and a feature in the 3D space triggering or associated with an intended haptic sensation or other haptic output, the haptic command signal may be created or modified such that the resultant haptic experience corresponds to the spatial relationship. A feature of the 3D space may include, for example, a sound feature or a lighting feature.

In another example, a thermal haptic modality may be employed to provide an intended haptic sensation. A thermal based haptic sensation may be created based on lighting information or a lighting feature in the spatialized audio/video data.

In a further example, relevant texture information in the spatialized audio/video data, e.g., bounciness and friction as well as information about object state (I.e., static or interactive) may be used. Texture information, by itself or along with other data points, may be used by the haptic management system 1100 to modify or create haptic outputs based on texture. For example, haptic texture in diverse forms (e.g., using shear effects, vibration, electrostatic force or others) may be realized. Texture information may also be used to infer about object stiffness and, thus, kinesthetic force.

In further examples, any or all of the supplemental media described above, e.g., application programming interface (API) of the application information, application physics engine information, sensor signals from a biometric sensor attached to the user, other sensors in the environment of the user, information about the users' neurophysiological and/or physical states, information about a user's environment (e.g., based on communications with IoT devices), and other information may be employed by the haptic management system 1100 to create or modify haptic command signals.

In embodiments, generating a haptic command signal may include warping haptic media for output by one or more specific selected haptic output devices. In embodiments, warping haptic media may include direct haptic command signal transcoding, e.g., transcoding an existing haptic command signal intended for one haptic output device (or devices) into a different haptic command signal intended for a different haptic output device (or devices). In embodiments, warping haptic media may include generating a haptic command signal for a specific haptic control device or devices based on haptic description information. In embodiments, warping haptic media may include generating a haptic command signal for a specific haptic control device or devices based on a haptic algorithm. Warping haptic media may further include generating a haptic command signal in a format suitable for a specific haptically enabled peripheral device, with the expectation that the haptic command signal will be further transcoded by the peripheral device to drive the haptic output devices associated with the peripheral device.

In embodiments, generating a haptic command signal may include distributing haptic output to one or more specific selected haptic output devices. As used herein, "distributing" haptic output refers to the selection or assignment of specific haptic output devices for outputting haptic content or effects. In embodiments, distributing haptic output may include selecting one or more specific haptic output devices to output an existing haptic command signal. In embodiments, distributing haptic output may include selecting one or more specific haptic output devices to output an intended or desired haptic effect described by haptic description information. Distribution of haptic outputs may be based on one or more of haptic media, supplementary media, and/or haptic device capabilities. In embodiments, the selected specific haptic output devices may be devices associated with peripheral devices that include one or more haptic output devices.

In embodiments, haptic command signals may be generated, e.g., by the haptic management system 1100, based on spatialized video and/or audio content. The haptic management system 1100 may be configured to determine, based on the spatialized video content or spatialized audio content, a spatial relationship between the virtual location of the user and a feature in the 3D space triggering the intended haptic sensation. As discussed above regarding spatialized audio and video data, associated information may include camera panning information, camera zoom information, surround sound information, or texture information. This information may be employed to determine a spatial relationship between the virtual location of the user and a feature in the 3D space triggering or associated with a haptic output. A feature of the 3D space may include, for example, a sound feature or a lighting feature. The spatial relationship may be used in the in the selection of haptic output devices, for example, according to the location of haptic output devices. For example, devices that are "closer" to a sound origin location may be selected to provide a stronger haptic effect than devices that are "further" from the sound origin location. The haptic management system 1100 may be configured to identify or select the haptic output device (or devices) for haptic output based on the spatial relationship.

Haptic management system 1100 distribution may take various forms. Intra-device distribution includes distribution of haptic outputs within the same device independently of body placement, number and/or types of actuators. Inter-device distribution include distribution of haptic effects across an ecosystem or arrangement of devices and peripherals independently of body placement, haptic modality, and types of devices or actuators. Intra-modality distribution includes distribution of haptic outputs within the same haptic modality independently of the number and types of actuators. Inter-modality distribution includes distribution of haptic outputs across multiple haptic modalities, independently of body placement and types of devices or actuators.

In embodiments, the step of generating a haptic command signal may involve one or more of creation, warping, and distribution methods working in combination to achieve a desired or intended haptic effect. For example, the haptic management system 1100 may use distribution methods to select specific haptic output devices (e.g., according to location) to achieve a desired haptic effect, use warping methods to develop haptic command signals appropriate for the selected haptic output device, and use creation/modifications methods to modify the haptic command signals according to a user environment.

Combining intra-device and intra-modality, the manager may receive an input that signals the type and location of the actuators within an existing and connected device (e.g., "rumble left" and "rumble right") and will use supplemental media from the application (e.g., audio, visual, metadata, controller API, motion tracking or other any other type of mapping) or embedded knowledge (e.g., understanding of haptic perception and actuator similarities and differences) to determine where and how to play the effect.

Combining intra-device and inter-modality, the manager may use information from the application and/or embedded knowledge to distribute haptic effects across different haptic modalities within the same device independently of how many modalities the device includes. (e.g., force, vibration, thermal, airflow, pressure, muscle and vestibular stimulation). Inter-modality distribution may require warping for proper output at alternative modality devices.

Combining inter-device and intra-modality, the manager may use embedded knowledge or information, contextual information from the application, and/or input data from one or more controllers (e.g., button, trackpad, position, acceleration input, type of actuators) to distribute the haptic effects across multiple devices (e.g., controllers, wearables, non-wearables, etc) having the same output modality. This strategy may also be applied to an ecosystem of haptic devices in direct contact with the user's body (e.g., vest, controllers, shoes, pants, cuffs, helmet, chairs . . . ) or not (e.g., externally placed ultrasound, airflow, thermal devices) to distribute the haptics accordingly.

Combining inter-device and inter-modality, the manager may use embedded knowledge, contextual information from the application and/or input from various haptic devices in direct contact (e.g., vest, controllers, shoes, pants, cuffs, helmet, chairs) or not with the body (e.g., externally placed ultrasound, airflow, thermal devices) to distribute the haptic effects accordingly to the number, distribution and modalities of the haptic devices. In this strategy, both locations and modalities of haptic effects may be altered.

In some aspects, a haptic effect developer may rank devices by priority to define which should output an effect if it (the device) is present in the haptic device ecosystem. Thus, the haptic manager's role may be to query information from devices (e.g., actuator placement and actuator modality) and use this to generate the appropriate haptic command signals to distribute the effect designed by the developer according to the ranking of priorities and triggering events.

Figure 5A:
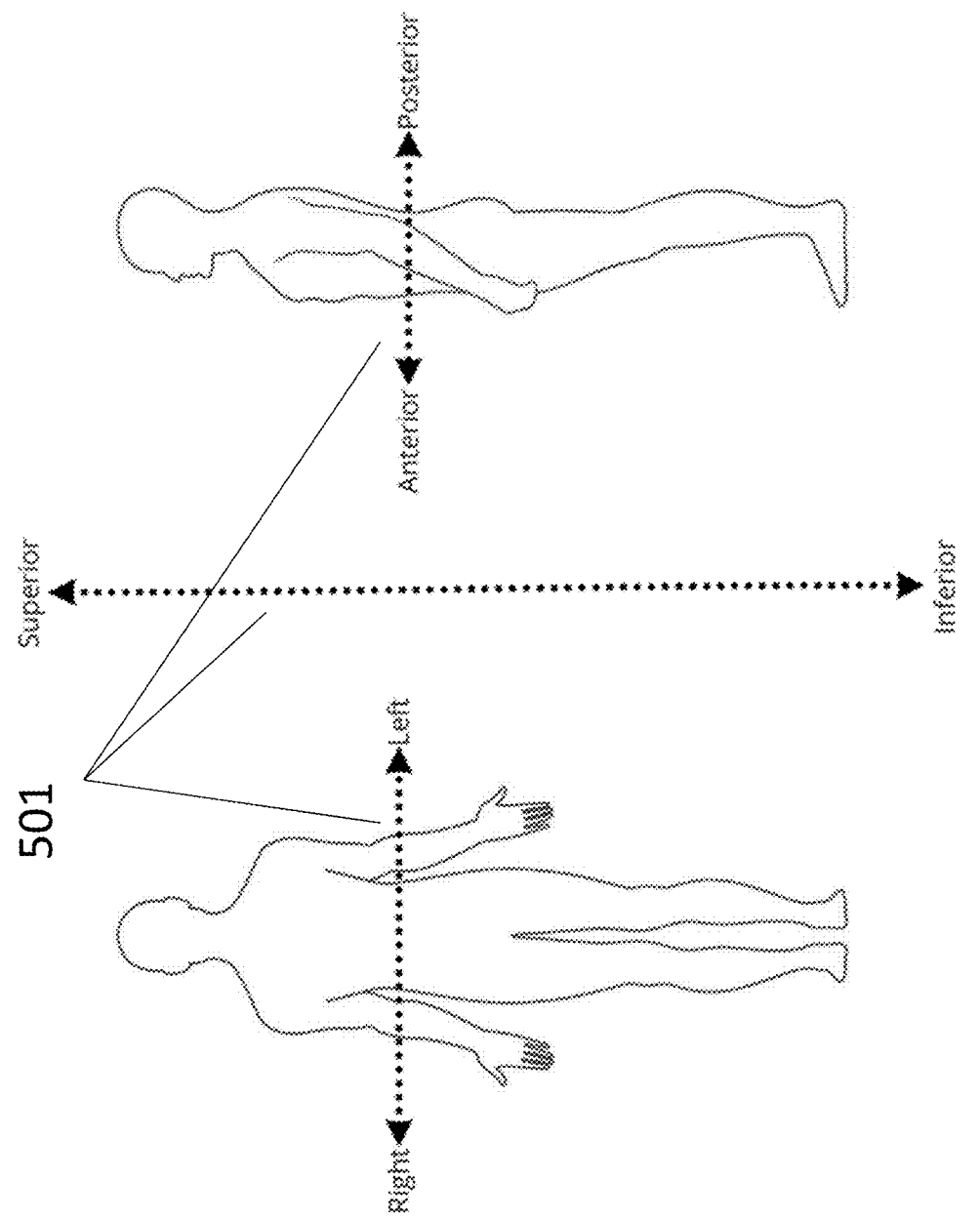
FIGS. 5A and 5B illustrate aspects of haptic body mapping techniques consistent with embodiments hereof.
Figure 5B:
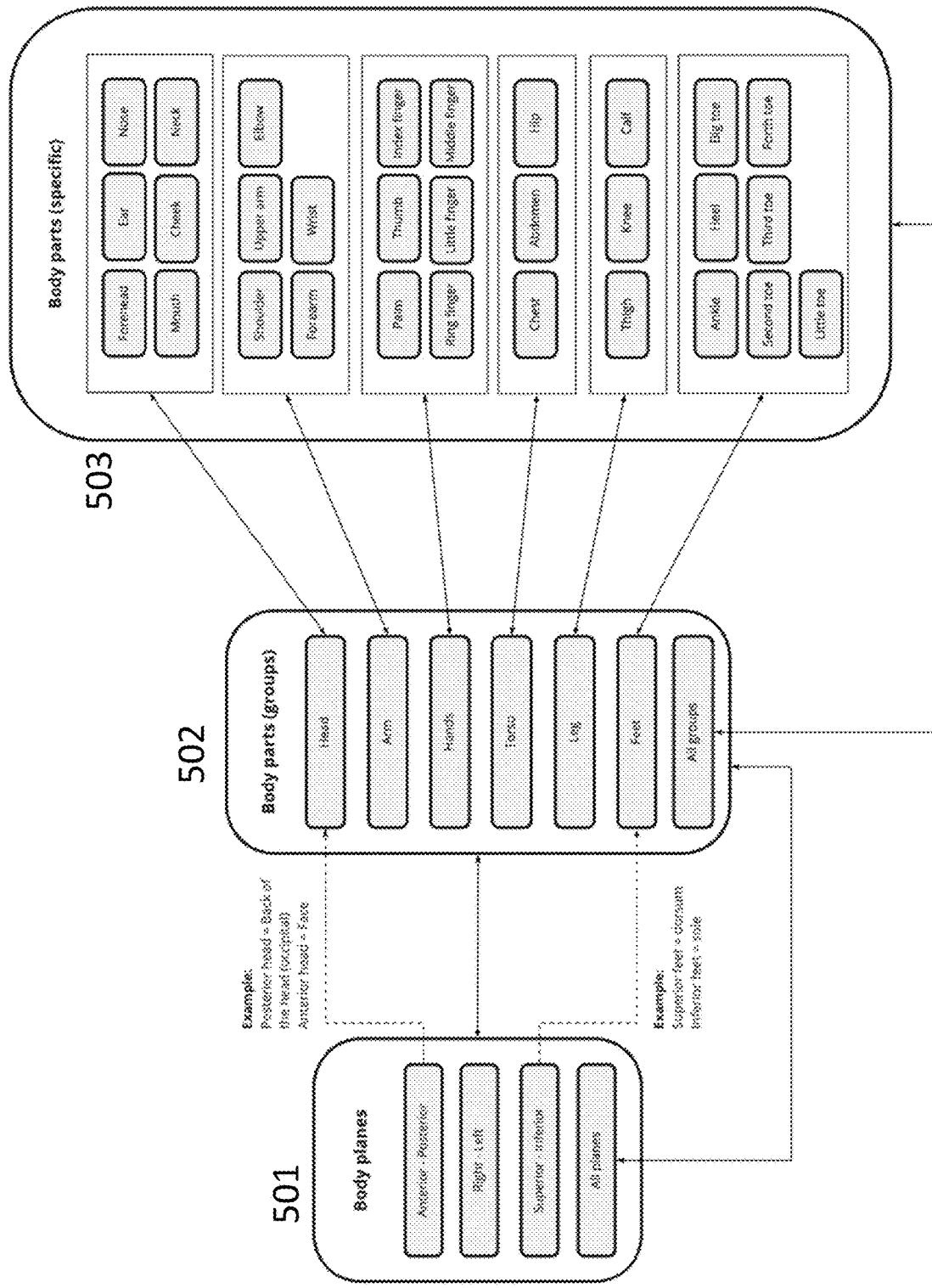

In embodiments, the haptic management system 1100 may engage in body mapping as part of a distribution function. Referring now to FIGS. 5A and 5B, the haptic management system 1100 may use body mapping information to understand the position of the haptic output devices and where to play haptic effects in the event that no haptic output device is present at the intended (e.g., designed) location of the haptic output.

Body mapping information may organized in clusters, from general e.g., (body planes, depicted in FIG. 5A) to groups of body parts leading to specific body parts (as shown in FIG. 5B). FIG. 5A shows broad body plane characterization, body planes 501 may include left/right, superior/inferior, anterior/posterior. FIG. 5B illustrates an organization of general and specific body parts. Body locations may therefore be grouped or identified according to body planes 501, body part groups 502, and specific body parts 503. This type of organization enables the haptic management system 1100 and its users to define broad and specific areas where the haptic output may be played (e.g., no matter the number of modalities or devices). For example, a specific haptic output such as an earthquake may be defined by a deterministic algorithm (e.g., or designed by an author) to trigger all devices in all body planes 501 and all body part groups 502 (Body planes=All, Group of body part=All), while another haptic effect such as a button click can be defined to trigger only specific body parts 503 (Body planes=Right, Group of Body part=Hands, Specific body part=index finger).

More complex interactions and haptic feedback may be created by mixing the planes and body parts with supplementary information. For example, a hit on the middle of head may be mixed with supplementary media, e.g., spatialized visual or spatialized audio to infer directionality and in this case an algorithm (or author) may describe the effects as:

Frontal hit to the head (directionality determined by supplementary media): Body planes=Anterior, Groups of body part=Head, Specific body part forehead;

Back hit to the head (directionality determined by supplementary media): Body planes=Posterior, Groups of body part=Head, Specific body part forehead.

Although use of either body planes 501, body part groups 502, and specific body parts 503 may be optional, each may play an important role in the haptic management system 1100. Body planes 501 may enable dynamic tracking and travelling of haptic outputs. For example:

Diving effect (following supplementary data or not): in the case of an agent (e.g., avatar) or observer submerging in a new environment (e.g., water), the haptic management system 1100 may use either direct information from the developer or supplementary visual information to create, for example, thermal illusion of immersing in the water. For such an effect, a description may be done in terms of "Body Planes=Inferior to Superior (following supplementary data threshold or not), Groups of body parts=All". Thus, the body planes 501 information may provide means for describing the movement or travelling of a haptic effect.

Proximation or Doppler effect (following supplementary data or not): these may relate to changes in haptic feedback (e.g., variations in intensity) that an agent or observer experiences as it moves farther or closer to the source of the effect (e.g., triggering event). These may be applied, for example, to trigger haptics in events such as explosions or to the stomp of an animal or herd as the agent moves closer or father from it and thus experience the haptic effects not only stronger or weaker but also in more or fewer parts of the body (e.g., far from the event would trigger only inferior regions such as foot with reduction in proximation triggering also superior regions).

Figure 6A:
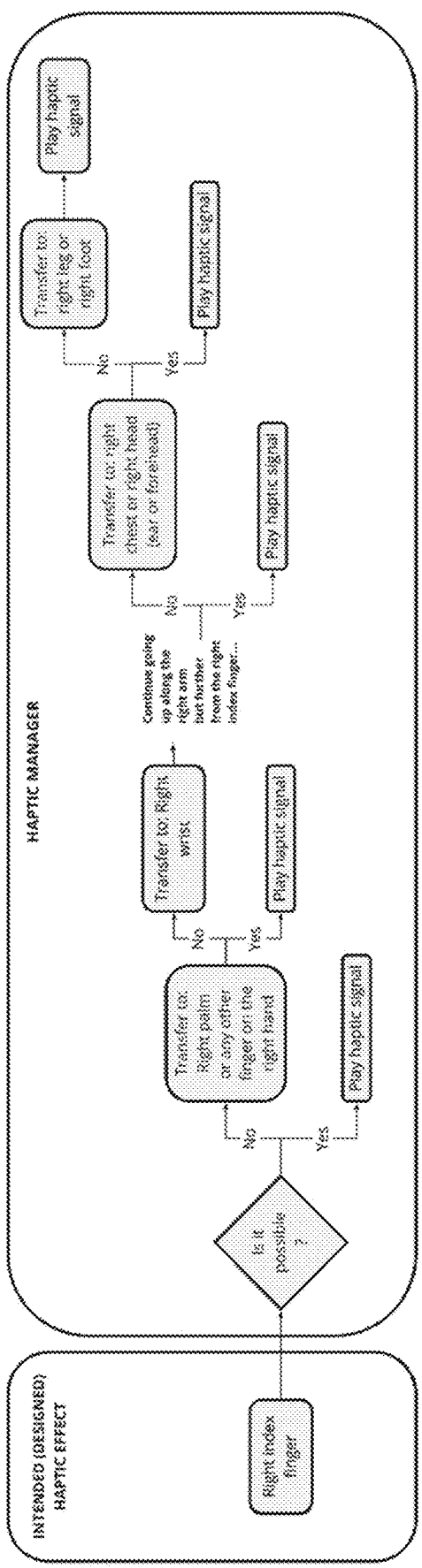
FIGS. 6A and 6B illustrate aspects of a haptic management system consistent with embodiments hereof.
Figure 6B:
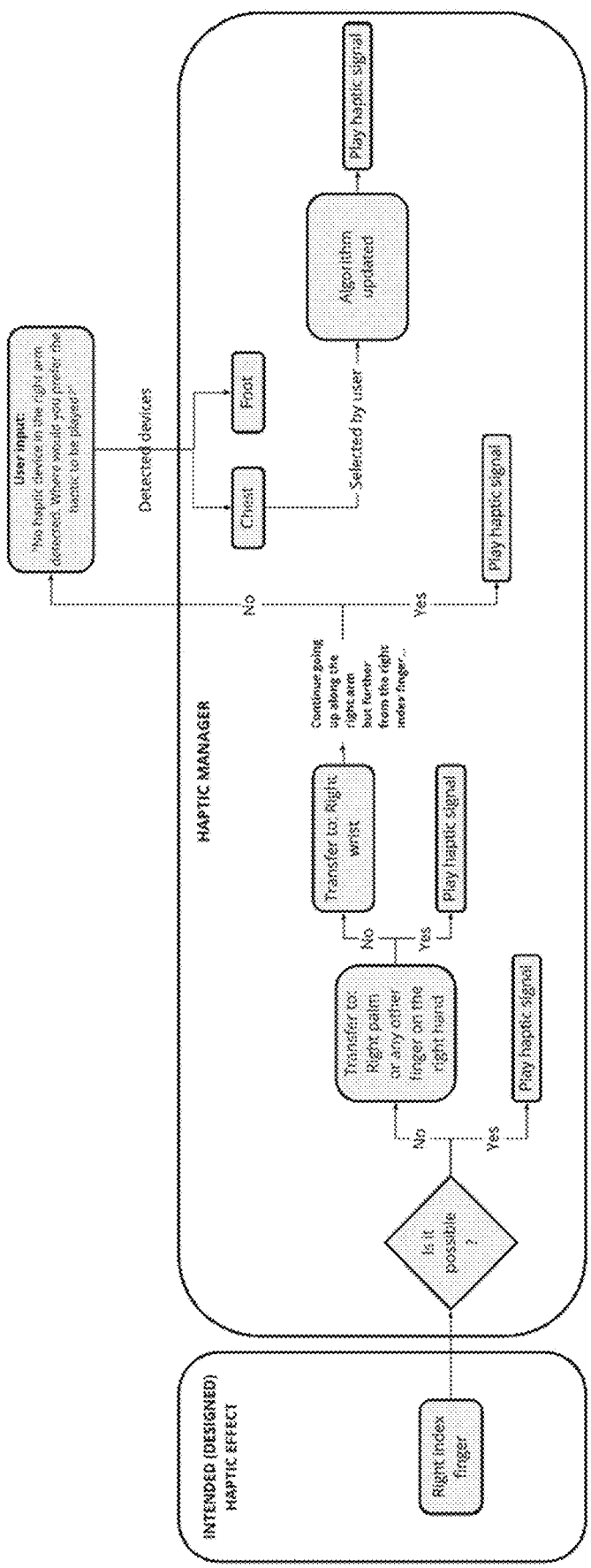

The haptic management system 1100 may also perform various forms of body mapping adaptations and inferences that range from deterministic to learning algorithms. These adaptations may occur in the event that there is no haptic device present at the intended (e.g., designed) location of the haptic output. In embodiments, the haptic management system 1100 may use a simple deterministic algorithm that searches for the most proximal available region to output the haptic effect within the intended group of body parts, and move further from that region if no haptic device is detected. Such an algorithm is depicted in FIG. 6A. The haptic management system 1100, when finding that no haptic output device is available at the right index finger, assesses the availability of haptic output devices at body part locations that are increasingly far away from the original location, while holding one or more aspects of the effect (in this case, right body plane) steady. The haptic management system 1100 may also take user input to define which body part (e.g., group or specific) to output the haptic effect to in case there is no haptic device present at the intended (e.g., designed) location of the haptic output. Such an algorithm is depicted in FIG. 6B. As shown in FIG. 6B, the user has selected (for example, pre-selected in a preferences file) an action for the haptic management system 1100 to take when a haptic device on the right arm is unavailable (in this case, the user has selected the chest). In other embodiments, a user may wish for the signal to change planes but remain within the appropriate body part group (e.g., play at the left hand instead of the right before outputting to the chest). More complex methods of distribution may be created by learning algorithms by using not only users' input but also diverse supplementary media.

Returning now to FIG. 3, in an operation 3010, the method 3000 may include communicating or outputting the generated haptic command signal (signals) to the haptic output device (devices) to cause the haptic output device (devices) to output haptic effects. In embodiments, the haptic output device/s may be caused to produce or approximate the intended haptic sensation defined or described by the haptic description information as modified (optionally) by supplementary media.

In embodiments, the haptic management system 1100 may operate with varying levels of autonomy, or inference. Operation of the haptic management system 1100 and generation of haptic command signals may be referred to herein as no inference, partial inference, and maximum inference. Greater levels of inference indicated greater levels of system autonomy.

Figure 7:
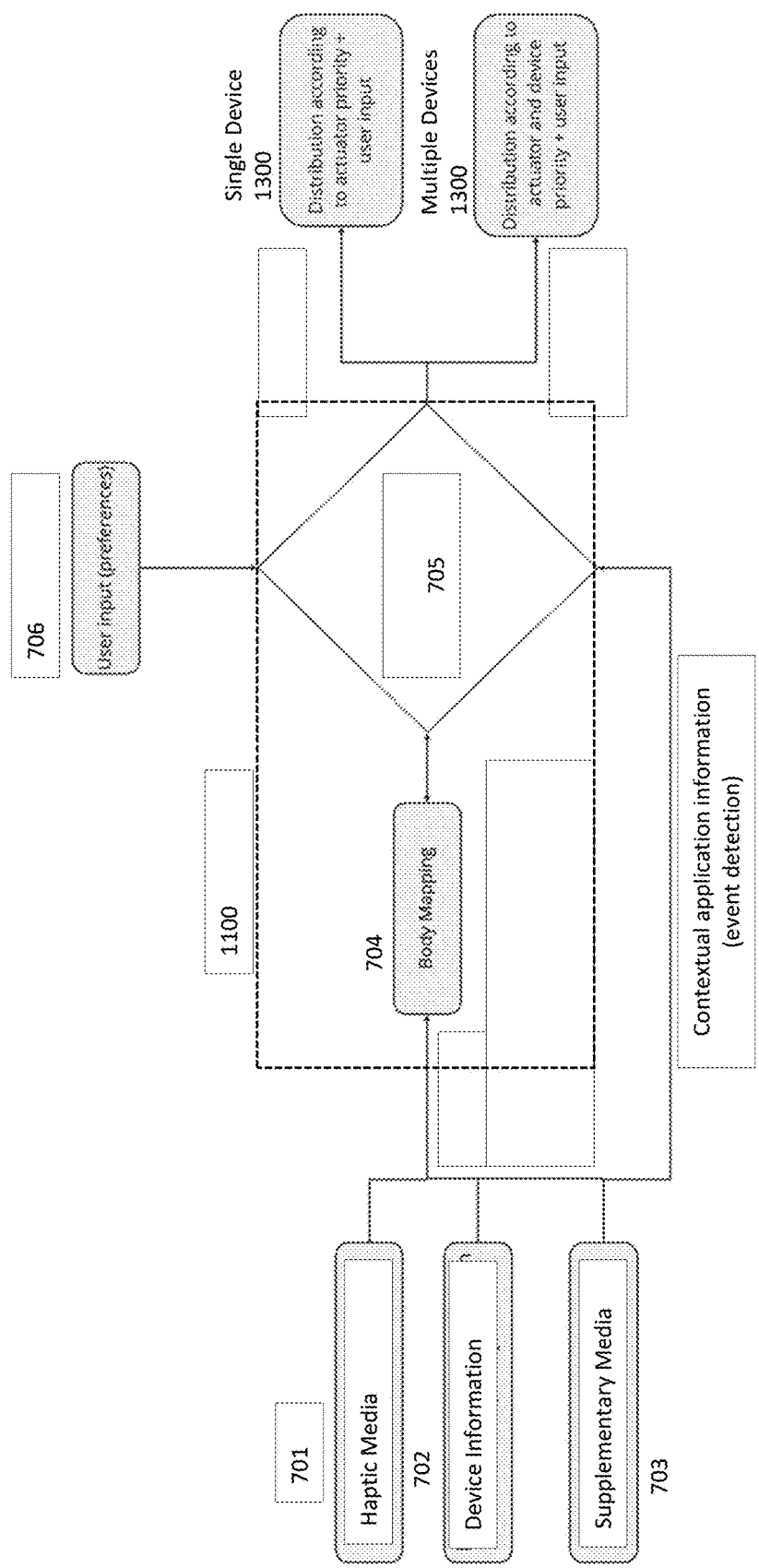
FIG. 7 illustrates an aspect of a haptic management system consistent with embodiments hereof.

FIG. 7 illustrates a no inference operation mode consistent with embodiments hereof. A no-inference operation mode may include operation of the haptic management system 1100 to generate haptic command signals with rules fully provided by the developer, programmer, or artist. In this context, the application developer may stipulate where and how a desired haptic effect or experience should be played based on the haptic output device or devices detected/identified by the haptic management system 1100. The developer may rank haptic output devices by priority to define which may output the haptic effects in the event that they are detected or identified by the system. Thus, in generating haptic command signals, the haptic management system 1100 operates primarily to distribute the haptic effects to the selected/identified haptic output devices. As shown in FIG. 7, haptic media 701, device information 702, and supplementary media 703 are received by the haptic management system 1100. As discussed above, the haptic media 701, device information 702, and supplementary media 703 are used in body mapping 704 to select haptic output devices to output the haptic effects at specific locations according to locations of available devices. User preferences 706 may be taken into account in the body mapping 704, as discussed above. Supplementary media, e.g., spatialized audio/video or other application data, may employed to identify or detect triggering events. Next, at 705, haptic command signals are generated for distribution to the appropriate one or more haptic output devices 1300 in response to the identified/detected triggering events.

Figure 8:
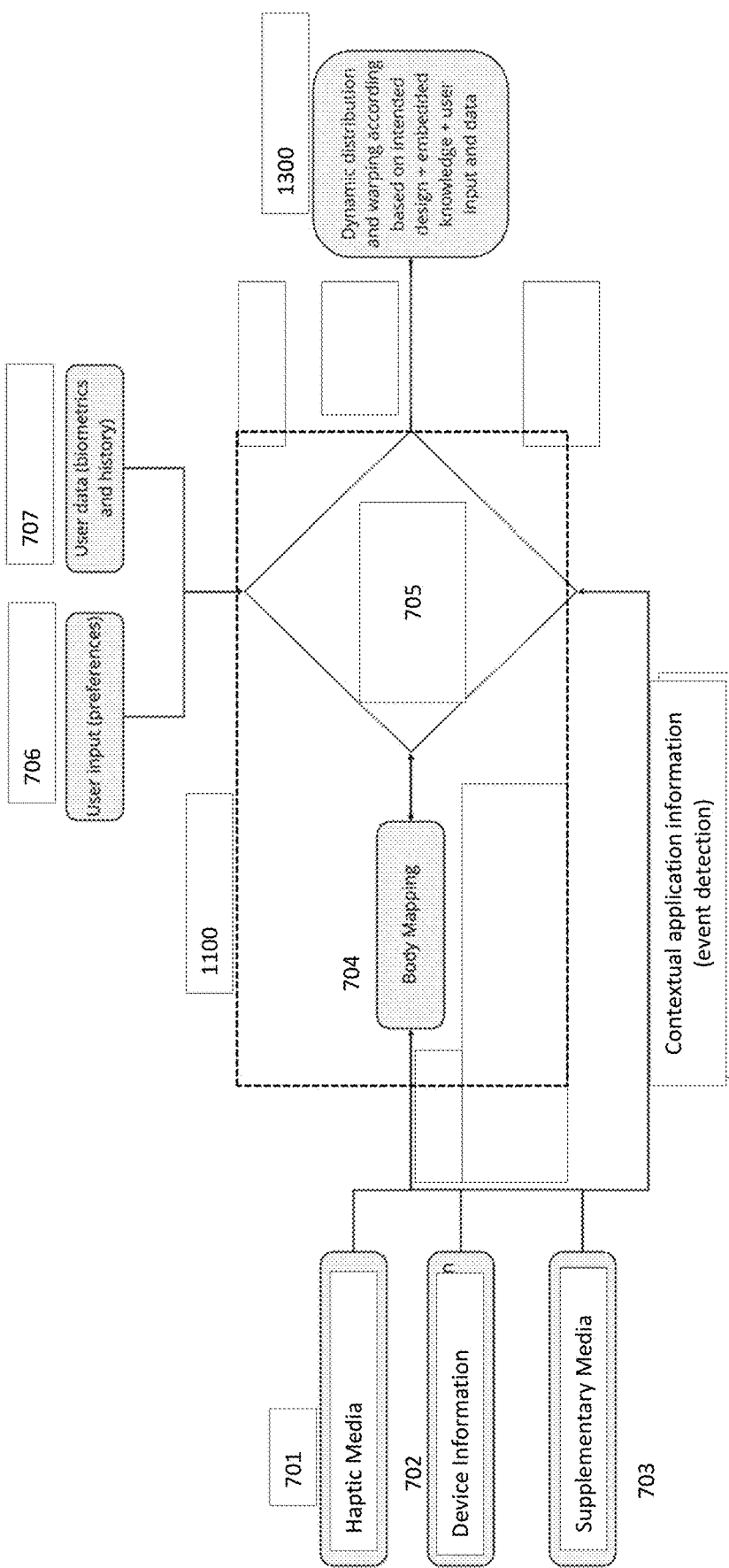
FIG. 8 illustrates an aspect of a haptic management system consistent with embodiments hereof.
Figure 9:
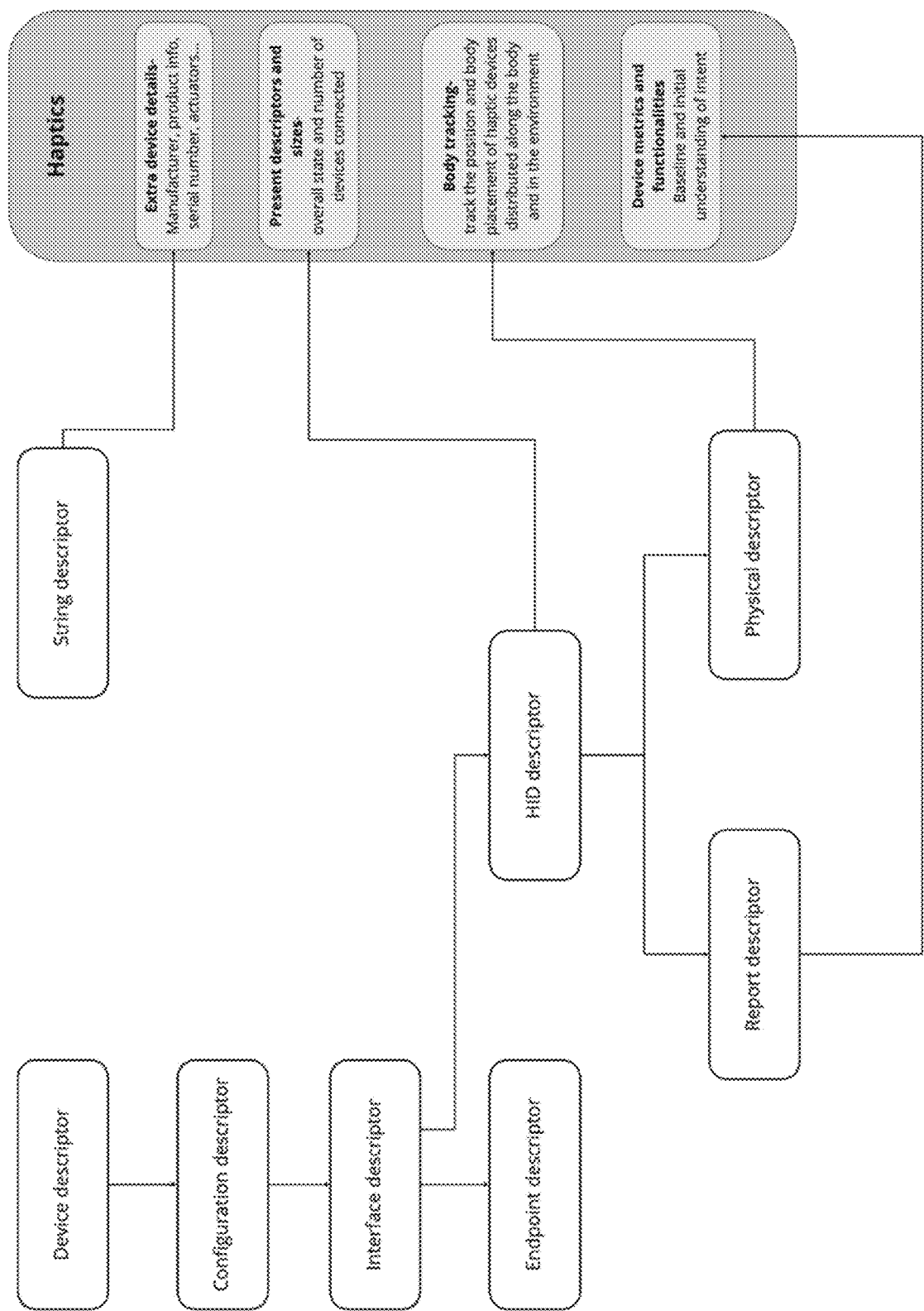
FIG. 9 illustrates an expanded USB architecture consistent with embodiments hereof.

FIG. 8 illustrates a partial inference operation mode consistent with embodiments hereof. In a partial inference operation mode, the haptic management system 1100 may operate to generate haptic command signals with rules and effects only partially provided by the developer, programmer, or artist. may include operation of the haptic management system 1100 to generate haptic command signals with rules fully provided by the developer, programmer, or artist. In partial inference operation, the haptic management system 1100 may operate to modify or improve (e.g., optimize) (e.g., through warping, distribution, and/or creation) baseline haptic effects (including haptic description information) provided by a programmer or artist to generate appropriate haptic command signals. In this mode of operation, the haptic management system 1100 employs additional inputs, e.g., haptic device capability included in the device information 702, supplementary media 703 (e.g., including user biometric and history data 707), as well as user preferences 706 generate haptic command signals. In this context, the application developer may provide a baseline haptic effect that undergoes body mapping 704, and, at 705, undergoes distribution, creation, and warping, as described above, to modify or improve (e.g., optimize) the baseline haptic effects for output to haptic output devices 1300 selected according to the distribution. The haptic management system 1100 generates the appropriate haptic command signals to distribute to the appropriate one or more haptic output devices 1300, warp the signals as required for output by the appropriate haptic output devices 1300, and, if required, modify the haptic command signals for output at the appropriate haptic output devices 1300.

For example, at the partial inference level, only part of the information used by the haptic management system 1100 is be pre-specified by the developer (e.g., the developer creates a baseline haptic effect and links it to the type or class of event that will trigger the effect). The remaining information may come from users' input (e.g., adjustment done through haptic settings or onboarding) and/or it may be inferred by the system, both for the purpose of haptic warping as well as body mapping and even localized haptic creation. Thus, at this intermediate level of inference, haptic effect creation and distribution merge. If the effect creation is not fully completed by the system (e.g., it requires a baseline effect), warping and/or modification based on supplemental media may be fully done by the system.

In this version of the haptic management system 1100 the application developer may create a baseline haptic effect and provide initial contextual information that links the effect to the event (e.g., metadata) and will enable the system to receive information from the application's API to collect information not only in terms of events but also in terms of spatialization, motion and controller's I/O. The system may also use other methods of information extraction such as computer vision to infer about reflection (e.g., for thermal), variations in light, and physics engine.

Rather than making use of developer ranked priorities for the modalities and body placements of the haptic effects, the haptic management system 1100 queries the local environment or consults a registry to detect haptic output devices and actuators at any point in time and may make constant queries to detect body motion. Users adjust initial preferences (e.g., sharpness and intensity, and even the correlation between gesture acceleration and change in intensity—for punching, kicking, and other types of movements). The haptic management system 1100 then operates to blend the above information (e.g., actuators present, body tracking, and context) with the user calibration/preferences and haptic perception knowledge to distribute, warp, and modify haptic effects appropriately. In embodiments, the haptic management system 1100 may employ machine learning techniques to generate haptic command signals via creation, warping, and distribution in the partial inference mode, as discussed in greater detail below.

The haptic management system 1100 may also operate in a maximum inference operational mode. In maximum inference operation, the haptic management system 1100 may generate haptic command signals with few or no rules provided by the developer, programmer, or artist. In a total inference operation mode, the haptic management system 1100 may combine all aspects of haptic command signal generation (e.g., warping, distribution, and/or creation) to generate signals from spatialized audio/video data and user input.

In embodiments, the haptic management system 1100 may employ machine learning techniques to generate haptic command signals via creation, warping, and distribution in the maximum inference mode. In the maximum inference mode, the system may take total control over distribution, warping, and creation/modification of haptic effect outputs, relying on machine learning models (e.g., supervised and unsupervised) or other heuristic algorithms to process the haptic media, supplementary media, and device information.

A haptic management system 1100 operating in a maximum inference mode use learned information about haptic perception and preferences for each individual user or groups of users (e.g., game style, intended objective . . . ) as well as per specific types of application (e.g., specificities of individual game titles) and groups of applications (e.g., clustering similarities and divergences between game genre) to create, distribute, and appropriately warp haptic effects and experiences.

The system may also be embedded with artificial intelligence methods such as reinforcement learning models to modulate the distribution and the system output according various factors. In embodiments, such factors may include user goals: for example, improve and/or maximize performance versus immersion using certain performance metrics from the game (e.g., overall score and progression, offensive and defensive indicators). In embodiments, such factors may include information acquired by the user (provided that the user consents with the collection of the data by the system): for example, neuro and physiological data, gaming history, time of the day, amount of game player hours in a single or multiple sessions, single or multiplayer, and even web browsing history.

Operating in a maximum inference mode, the haptic management system 1100 may also use all or some of the contextual gaming data provided in the above-discussed partial inference mode, including direct access to a physics engine, a system API, etc.

In generating haptic command signals in the maximum inference mode using machine learning, the haptic management system 1100 may use two different approaches, alone or in combination. First, the haptic management system 1100 may use supervised machine learning models in which the application developers provide the system with a database of haptic effects linked to events in to be used as baseline for the model to learn how to create, modify, warp, and distribute haptic effect without even requiring a baseline haptic effect. The haptic management system 1100 may also use information related to the haptic preference of certain clusters or profile of users (e.g., by performance ranking and/or type of game most played) and haptic preferences from other applications.

In a second approach, the haptic management system 1100 may use unsupervised machine learning models. Using unsupervised models, the haptic management system 1100 may access a database of effects that is not labelled or linked to any content, enabling the system to fully learn and optimize creation, modification, warping, and distribution of haptic outputs per user or group of users across the different events and applications.

As discussed above, the haptic management system 1100 may operate at various levels of inference or intelligence and may also operate in various locations. The table below provides examples of how these may be combined and executed via available hardware and devices.

| | Haptic Manager Inference Level | | |
|---|---|---|---|
| Device | No Inference | Partial Inference | Maximum Inference |
| Local computer | Input information comes from a local host or cloud. The haptic management system operates on the local host and works as a pass-through (via wireless or wired network) to distribute haptic outputs either to all devices linked to the local computer or through layers of distribution from local computer to one or more hub devices to various executing devices. All steps are performed accordingly to the specified priorities/rules previously generated by the developer. | Input information comes from a computing device (local host), users' input (haptic settings adjustment) and inferences done by the haptic management system (e.g., body tracking, type, placement and number of actuators). Processing, synchronization and distribution are all automated and done either directly from the local computer to all devices or through layers of distribution from local computer to one or more hub devices to various executing devices. Automatic warping of haptic generation is a feature, but baseline effect may be designed by developer. | Input information comes from the computing device (local host) and/or is extracted by the haptic management system. Processing, synchronization and distribution are all automated and done either directly from the local computer to all devices or through layers of distribution from local computer to one or more hub devices to various executing devices. Automatic haptic generation is also a feature of the haptic management system. |
| Haptic or peripheral device | Input information comes from the cloud or local host. The haptic management system operates on one or more peripheral devices, and may operate as a pass-through (via cloud, wireless or wired network) to distribute the haptic outputs to all selected devices simultaneously. The haptic management system may also operate in one or more hub devices (also coupled via could or network) that will further distribute the haptic outputs to executing devices (via cloud or network) accordingly to the specified priorities/rules previously generated by the developer. | Input information comes from the computing device (cloud or local host), users' input (haptic settings adjustment) and inferences done by the haptic management system (e.g., body tracking, type, placement and number of actuators). Processing, synchronization and distribution are all automated and done through one or more devices where the haptic management system is hosted. Distribution can happen directly to all devices (all hosting the haptic management system and coupled via cloud, wired or wireless network) or through one or more commander devices (hosts of the haptic management system) with further communicate with executing devices. Automatic warping of haptic generation is a feature, but baseline effect may be designed by developer. | Input information comes from the computing device (cloud or local host) and/or is extracted by the haptic management system. Processing, synchronization and distribution are all automated and done through one or more devices where the haptic management system is hosted. Distribution can happen directly to all devices (all hosting the haptic management system and coupled via cloud, wired or wireless network) or through one or more commander devices (hosts of the haptic management system) with further communicate with executing devices. Automatic haptic generation is also a feature of the haptic management system r. |
| Cloud | Input information comes from the cloud. The haptic management system operates on the cloud but works as a pass-through, distributing the haptic outputs to all devices simultaneously (via cloud) or to one or more hub devices (also via cloud) that will further distribute the haptic outputs to executing devices (via cloud or network) | Input information comes from the cloud. Part of it is inferred by the haptic management system (e.g., body tracking, type, placement and number of actuators). Users' input is also taken into consideration. The haptic management system operates on the cloud and processing, synchronization and distribution are all automated and done through the cloud. | Input information comes from the cloud and/or is extracted by the haptic management system. The haptic management system operates on the cloud and processing, synchronization and distribution are all automated and done through the cloud. Distribution can happen directly to all devices in the cloud or from hub |

| Haptic Manager Inference Level | | | |
|---|---|---|---|
| Device | No Inference | Partial Inference | Maximum Inference |
| | accordingly to the specified priorities/rules previously generated by the developer. | Distribution may happen directly to all devices in the cloud or from hub devices (commanders-also coupled to the cloud) to executing devices. Automatic warping of haptic generation is a feature, but baseline may be designed by developer. | devices (commanders-also coupled to the cloud) to executing devices. Automatic haptic generation is also a feature of the haptic management system. |

In embodiments, communications between the haptic management system 1100 and various peripheral devices associated with methods described herein may be implemented by the Universal Serial Bus (USB) Human Interface Device (HID) standard. The USB HID standard provides a communication architecture that enables a personal computer to connect with various devices using a four-wire USB cable. Within HID communication architecture, there is also a wide range of relevant data that is available in the HID descriptor that may be used by the haptic management system 1100 to distribute, warp and/or create haptic feedback. In general, three types of data route and retrieval are of relevance.

HID descriptors are class device descriptors that identify which other HID class descriptors are present and indicates their sizes. These class device descriptors may provide the haptic management system 1100 with information about the overall state and number of devices connected, allowing the haptic management system 1100 to better understand the available possibilities for distribution, warping, and creation.

Report descriptors describe each piece of data that a haptic output device generates and what the data is actually measuring. Report descriptors are made up of items that provide information about the device, enabling, for example the application related software to assign a functionality to an input (e.g., use joystick to move object A). Thus, this type of data may be used by the haptic management system 1100 as a baseline that describes the initial intention of the application developer. Report descriptor information may be used distributing, warping or creating haptic feedback.

Physical descriptors provide information about the part or parts of the human body used to activate the controls on a device. This information can be used by the haptic management system 1100 to track the position and body placement of haptic devices distributed not only along the body but also in the environment.

Other types of data specified by the USB HID standard may also be used by the haptic management system 1100. For example, string descriptors, which may be used to provide information about manufacturer, product and serial number of the device and, thus, giving more information to the haptic management system 1100 about the capabilities of the haptic devices and possibly the actuators in it.

The methods, systems, and devices discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting. In the present disclosure, the term "or" and "and/or" are used interchangeably. As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in some implementations," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A haptic management system for providing one or more haptic effects associated with an application that is providing at least one of spatialized video content or spatialized audio content to an end user device of a user, the haptic management system comprising:
   at least one processor;
   a non-transitory computer-readable medium having instructions which, when executed by the at least one processor, causes the at least one processor to perform the following:
      receiving, from the application, haptic description information which describes an intended haptic sensation to accompany the spatialized video content or spatialized audio content, wherein the spatialized video content and spatialized audio content are video content and audio content, respectively, that represent a three-dimensional (3D) space surrounding a virtual location of a user in the 3D space and provides information regarding a direction of one or more features in the 3D space relative to the virtual location of the user;
      identifying a haptic output device which is in a physical environment of the user and is able to generate one or more haptic effects for the user;
      determining a haptic capability of the haptic output device;
      generating a haptic command signal for the haptic output device based on the haptic capability of the haptic output device, and based on the intended haptic sensation described by the haptic description information, wherein the haptic command signal has a different format than the haptic description information or has different content than the haptic description information; and
      communicating the haptic command signal to the haptic output device to cause the haptic output device to produce or approximate the intended haptic sensation.

2. The haptic management system of claim 1, wherein the spatialized video content includes an omnidirectional video that represents an appearance of the 3D space in multiple directions relative to the virtual location of the user.

3. The haptic management system of claim 1, wherein the spatialized audio content includes multiple channels of audio content that provide surround sound to the user.

4. The haptic management system of claim 1, wherein the instructions cause the at least one processor to:
   determine, based on the spatialized video content or spatialized audio content, a spatial relationship between the virtual location of the user and a feature in the 3D space triggering the intended haptic sensation; and
   performing at least one of: (i) creating the haptic command signal based on the spatial relationship, or distributing the intended haptic sensation by selecting, based on the spatial relationship, the haptic output device from among a plurality of haptic output devices to output the intended haptic sensation.

5. The haptic management system of claim 4, wherein at least one of the spatialized video content or the spatialized audio content is part of a MPEG-I stream, and wherein the instructions cause the at least one processor to generate the haptic command signal based on at least one of the following embedded in the MPEG-I stream: camera panning information, camera zoom information, surround sound information, or texture information.

6. The haptic management system of claim 4, wherein the intended haptic sensation has a thermal haptic modality,
   and wherein the instructions cause the at least one processor to determine the haptic command signal for the intended haptic sensation based on lighting information determined from the spatialized video content.

7. The haptic management system of claim 1, wherein the instructions cause the at least one processor to determine whether the haptic description information is associated with a haptic device type or haptic modality that does not match a haptic device type or haptic modality of the haptic output device, and
   wherein the haptic command signal is generated in response to a determination that the haptic device type or haptic modality associated with the haptic description information does not match the haptic device type or haptic modality of the haptic output device.

8. The haptic management system of claim 7, wherein the haptic description information includes a baseline signal, and
   wherein the instructions cause the at least one processor, in response to the determination that the haptic device type or haptic modality associated with the haptic description information does not match the haptic device type or haptic modality of the haptic output device, to generate the haptic command signal by performing a warping operation that transforms the baseline signal into the haptic command signal based on the haptic capability of the haptic output device and the intended haptic sensation.

9. The haptic management system of claim 1, wherein the haptic description information is not specific to at least one of: a type of haptic output devices or a haptic modality.

10. The haptic management system of claim 1, wherein the haptic description information includes one or more haptic primitives, wherein each of the one or more haptic primitives is a predefined haptic effect portion, and
    wherein the instructions further cause the at least one processor to generate the haptic command signal based on the one or more haptic primitives and the haptic capability of the haptic output device.

11. The haptic management system of claim 1, wherein the instructions cause the at least one processor to generate the haptic command signal based on supplementary media information, wherein the supplementary media information includes at least one of: information provided by an application programming interface (API) of the application, a physics engine being executed by the application, sensor signals from a biometric sensor attached to the user or another sensor in the physical environment of the user.

12. The haptic management system of claim 1, wherein the instructions cause the at least one processor to generate the haptic command signal based on a machine learning model that models preference of the user for haptic effects or how the user perceives haptic effects.

13. The haptic management system of claim 1, wherein the instructions cause the at least one processor to generate the haptic command signal based on user input.

14. The haptic management system of claim 1, wherein the haptic output device is one of a plurality of haptic output devices identified by the at least one processor to be in the physical environment of the user and able to generate one or more haptic effects for the user,
    wherein the haptic description information describes an intended location of the intended haptic sensation, and
    wherein the instructions further cause the at least one processor to distribute the intended haptic sensation by selecting the haptic output device from among the plurality of haptic output devices to output the intended haptic sensation, wherein the selecting is based on the intended location of the intended haptic sensation and based on respective locations of the plurality of haptic output devices.

15. The haptic management system of claim 14, wherein the plurality of haptic output devices include multiple wearable devices, and
  wherein the instructions cause the at least one processor to distribute the intended haptic sensation based on body mapping information which divides a body of the user into multiple clusters, and divide each of the multiple clusters into multiple groups of body parts,
  wherein the body mapping information identifies, for each of the multiple clusters, which of the multiple wearable devices are part of the cluster, and further identifies, for each of the multiple groups of body parts, which of the multiple wearable devices are part of the group.

16. The haptic management system of claim 1, further comprising a first haptic management computing device that includes the at least one processor, and comprising a second haptic management computing device that includes at least another processor,
  wherein the first haptic management computing device and the second haptic management computing device communicate in a nested fashion, in which the second haptic management computing device is configured to distribute the intended haptic sensation to the first haptic management computing device, and
  wherein the first haptic management computing device is configured to generate the haptic command signal based on the intended haptic sensation, and to communicate the haptic command signal to the haptic output device.

17. The haptic management system of claim 1, further comprising a server which includes the at least one processor, wherein the server is configured to communicate with the haptic output device via a network.

18. The haptic management system of claim 1, further comprising a computing device that includes the at least one processor, wherein the computing device is connected to the haptic output device via a USB interface, and wherein the at least one processor is configured to generate the haptic command signal based on a descriptor provided by the USB interface.

19. A method for providing one or more haptic effects associated with an application that is providing at least one of spatialized video content or spatialized audio content to an end user device of a user, the method comprising:
  receiving, from the application, haptic description information which describes an intended haptic sensation to accompany the spatialized video content or spatialized audio content, wherein the spatialized video content and spatialized audio content are video content and audio content, respectively, that represent a three-dimensional (3D) space surrounding a virtual location of a user in the 3D space and provides information regarding a direction of one or more features in the 3D space relative to the virtual location of the user;
  identifying a haptic output device which is in a physical environment of the user and is able to generate one or more haptic effects for the user;
  determining a haptic capability of the haptic output device;
  generating a haptic command signal for the haptic output device based on the haptic capability of the haptic output device, and based on the intended haptic sensation described by the haptic description information, wherein the haptic command signal has a different format than the haptic description information or has different content than the haptic description information; and
  communicating the haptic command signal to the haptic output device to cause the haptic output device to produce or approximate the intended haptic sensation.

* * * * *